United States Patent [19]
Saito et al.

[11] Patent Number: 6,067,966
[45] Date of Patent: May 30, 2000

[54] ENGINE FUEL SUPPLY SYSTEM

[75] Inventors: Chitoshi Saito; Masahiko Kato; Masafumi Sougawa, all of Hamamatsu, Japan

[73] Assignee: Sanshin Kogyo Kabushiki Kaisha, Hamamatsu, Japan

[21] Appl. No.: 09/098,088

[22] Filed: Jun. 16, 1998

Related U.S. Application Data

[63] Continuation-in-part of application No. 08/932,231, Sep. 17, 1997, Pat. No. 5,890,472.

[30] Foreign Application Priority Data

| Sep. 17, 1996 | [JP] | Japan | 8-244504 |
| Mar. 3, 1997 | [JP] | Japan | 9-047664 |
| Jun. 18, 1997 | [JP] | Japan | 9-160782 |
| Aug. 20, 1997 | [JP] | Japan | 9-223822 |

[51] Int. Cl.[7] .................................................. F02M 37/04
[52] U.S. Cl. .................................... 123/514; 123/516
[58] Field of Search ................................ 123/510, 511, 123/516, 514, 541

[56] References Cited

U.S. PATENT DOCUMENTS

| 5,579,740 | 12/1996 | Cotton et al. | 123/516 |
| 5,758,622 | 6/1998 | Rembold et al. | 123/456 |
| 5,797,378 | 8/1998 | Kato | 123/516 |
| 5,832,902 | 11/1998 | Davis et al. | 123/514 |
| 5,855,197 | 1/1999 | Kato | 123/516 |
| 5,890,472 | 4/1999 | Saito | 123/516 |

*Primary Examiner*—Thomas N. Moulis
*Attorney, Agent, or Firm*—Knobbe, Martens, Olson & Bear LLP

[57] ABSTRACT

A fuel supply system for providing fuel from a fuel source to a combustion chamber of an engine is disclosed. The fuel supply system includes a vapor separator in which vapor is separated from fuel supplied from the fuel source. A pre-pressurizing pump pressurizes fuel from the vapor separator to a first pressure and delivers it to a high pressure pump. The high pressure pump pressurizes the fuel to a pressure above the first pressure and delivers it to a fuel rail to which is connected a fuel injector for delivering fuel into the combustion chamber. A fuel return line extends from the fuel rail for returning undelivered fuel back to the fuel system. A valve controls the flow of fuel through the return line and maintains the fuel at high pressure in the fuel rail. A fuel cooler is provided along the return fuel line.

15 Claims, 19 Drawing Sheets

6,067,966

1

ENGINE FUEL SUPPLY SYSTEM

RELATED APPLICATIONS

This application is a continuation-in-part of U.S. patent application Ser. No. 08/932,231, filed Sep. 17, 1997, now U.S. Pat. No. 5,890,472.

FIELD OF THE INVENTION

The present invention is a fuel supply system for an internal combustion engine. More particularly, the invention is a fuel supply system arranged to deliver vapor-free high pressure fuel to a fuel injector for injection into a combustion chamber of the engine.

BACKGROUND OF THE INVENTION

Internal combustion engines operating on a two-cycle principal have traditionally been arranged so that fuel is delivered into an incoming air supply. The fuel and air mixture passes into a crankcase chamber for crankcase compression, and is then delivered through a scavenge passage to a combustion chamber of the engine for combustion therein.

As is well known in the operating cycle of a two-cycle engine, an exhaust port leading from the combustion chamber is open during at least part of the time the scavenge passage is open. Thus, exhaust along with a portion of the air and fuel charge being delivered through the scavenge port flow through the exhaust port into the exhaust system.

In this arrangement, and especially at low engine speeds, a large amount of fuel must be added to the air to compensate for the loss of fuel flowing through the cylinder and directly out the exhaust port. Supplying excessive fuel, however, is costly and can result in stalling of the engine. In addition, the quantities of fuel flowing into the exhaust may foul a catalyst positioned in the exhaust system.

As one attempt to solve the above-stated problems, some two-cycle engines have been arranged to have fuel directly injected into the combustion chamber. A fresh air charge is supplied to each combustion chamber through the crankcase and a scavenge port. Once air is supplied to the combustion chamber and the exhaust port is closed, a fuel injector injects fuel directly into the combustion chamber for mixing with the air.

This arrangement has the benefit that little of the fuel flows unburned into the exhaust system, and the amount of fuel supplied to each combustion chamber may be closely controlled. On the other hand, in order for this system to work, fuel must be supplied to the fuel injector under high pressure. In particular, a large amount of fuel must be sprayed into the combustion chamber in a short time, and in a manner which atomizes the fuel. Thus, these systems have a fuel supply which includes a fuel tank and a high pressure pump for pumping fuel from the tank and supplying it under high pressure to the fuel injector.

A problem with this arrangement arises in pressurizing the fuel from tank pressure (typically atmospheric pressure) to this high pressure by the high pressure pump. First, if a single pump is used, for the pump to create the large pressure head in the single step, its capacity must be very low and insufficient fuel may be supplied to the engine. Another problem is the introduction of large amounts of vapor into the fuel. This vapor may cause a vapor lock in the system and alters the amount of fuel which is actually delivered to the combustion chamber during a desired fuel delivery time. Thirdly, such a high pressure pump must operate at high

2 speeds, and thus achieves high temperatures. When the fuel is hot, vapor creation within the fuel is accelerated, worsening the above-stated problems.

A fuel supply system for delivering fuel from a fuel source to a combustion chamber of an engine through a fuel injector at high pressure and without the above-stated problems is desired.

SUMMARY OF THE INVENTION

In accordance with the present invention, there is provided an improved fuel supply system for supplying fuel from a fuel source, such as a fuel tank, to a combustion chamber of an engine.

The fuel supply system includes a vapor separator in which vapor is separated from fuel supplied from the fuel source. A pre-pressurizing pump pressurizes fuel from the vapor separator to a first pressure and delivers it to a high pressure pump. The high pressure pump pressurizes the fuel to a pressure above the first pressure and delivers it to a fuel rail to which is connected a fuel injector for delivering fuel into the combustion chamber.

A fuel return line extends from the fuel rail for returning undelivered fuel back to the fuel system. A valve controls the flow of fuel through the return line and maintains the fuel at high pressure in the fuel rail. A fuel cooler is provided along the return fuel line.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In general, the present invention comprises a fuel supply system for an internal combustion engine. The fuel supply system is arranged to deliver fuel at high pressure for injection into each combustion chamber of the engine, and yet is arranged to prevent the creation and delivery of vapor within the fuel to the combustion chamber.

Figure 1:
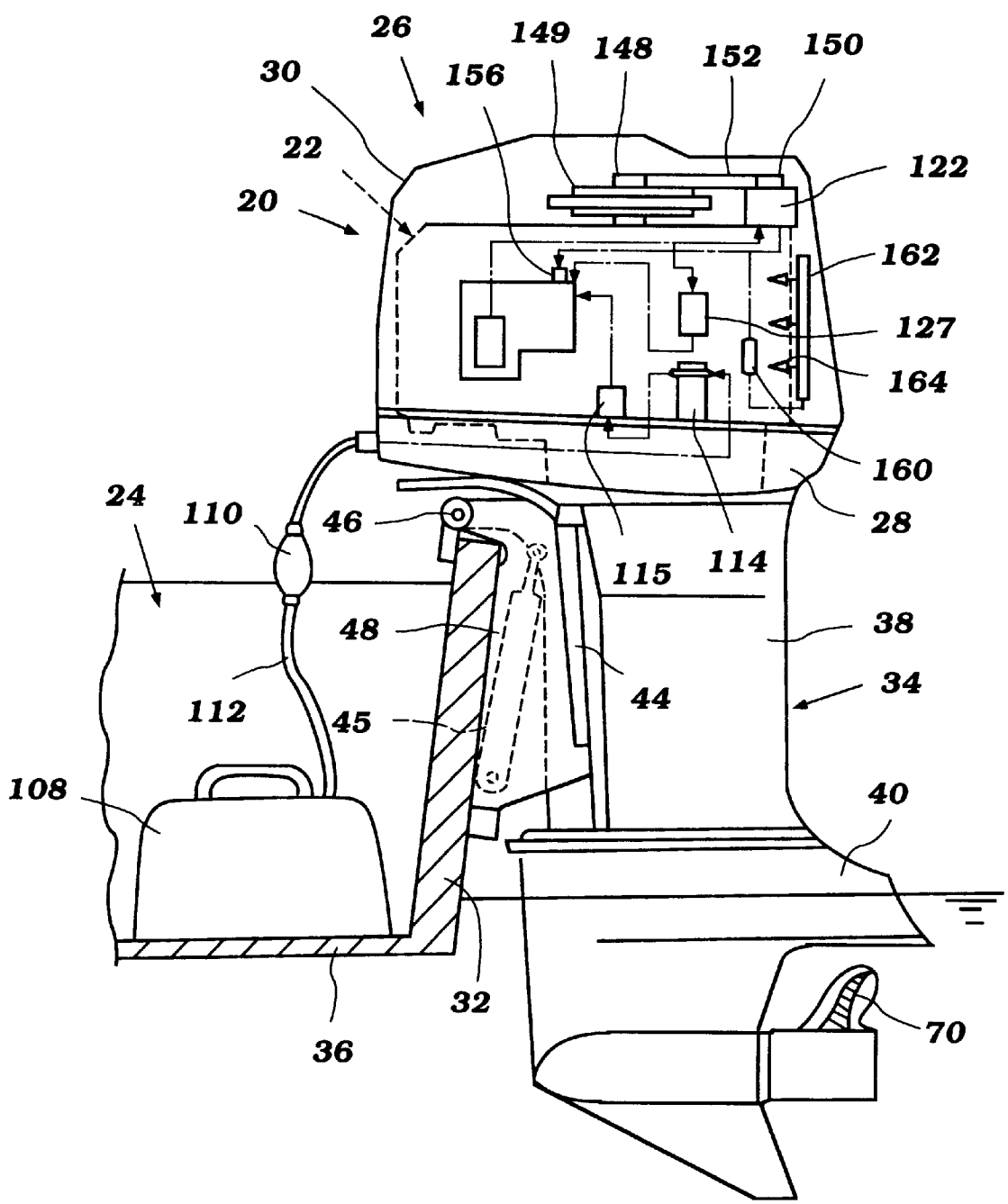
FIG. 1 is a side view of an outboard motor propelling a watercraft, illustrated partially and in cross-section, the motor powered by an engine having a fuel supply system in accordance with the present invention and illustrated in phantom.

Referring to FIG. 1, there is illustrated an outboard motor 20 powered by an engine 22 and having a fuel supply system in accordance with the present invention. The engine 22 having the fuel supply system is described for use with an outboard motor 20 since this particular application is one for which the engine 22 described is particularly useful. It should be understood, however, that the engine 22 which is supplied with fuel with the fuel supply system arranged as described may be used in other applications.

As illustrated in FIG. 1, the outboard motor 20 is of the type utilized to propel a watercraft 24. The outboard motor 20 has a powerhead area 26 comprised of a lower tray portion 28 and a main cowling portion 30. The motor 20 includes a lower unit 34 extending downwardly from the cowling portion 30. The lower unit 34 comprises an upper or "drive shaft housing" section 38 and a lower section 40.

The powerhead area 26 of the motor 20 is connected to a steering shaft (not shown). The steering shaft is supported for steering movement about a vertically extending axis within a swivel or steering bracket 44. The swivel bracket 44 is connected by means of a pivot pin 46 to a clamping bracket 48 which is attached to a transom portion 32 of a hull 36 of the watercraft 24. The pivot pin 46 permits the outboard motor 20 to be trimmed and tilted up about the horizontally disposed axis formed by the pivot pin 46. An oil filled cylinder 45 may be used to assist in this movement.

Figure 2:
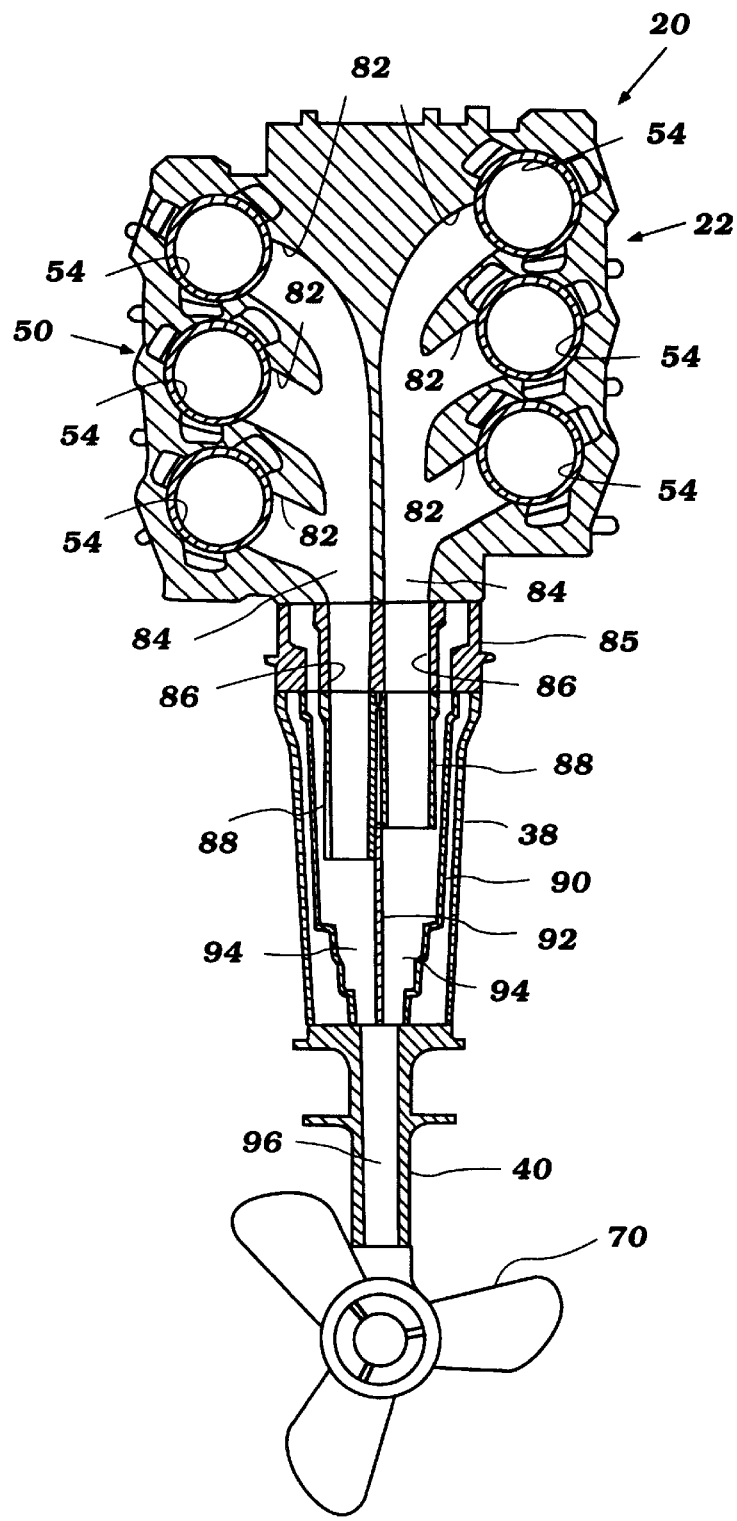
FIG. 2 is a cross-sectional view of the engine powering the motor illustrated in FIG. 1.
Figure 5:
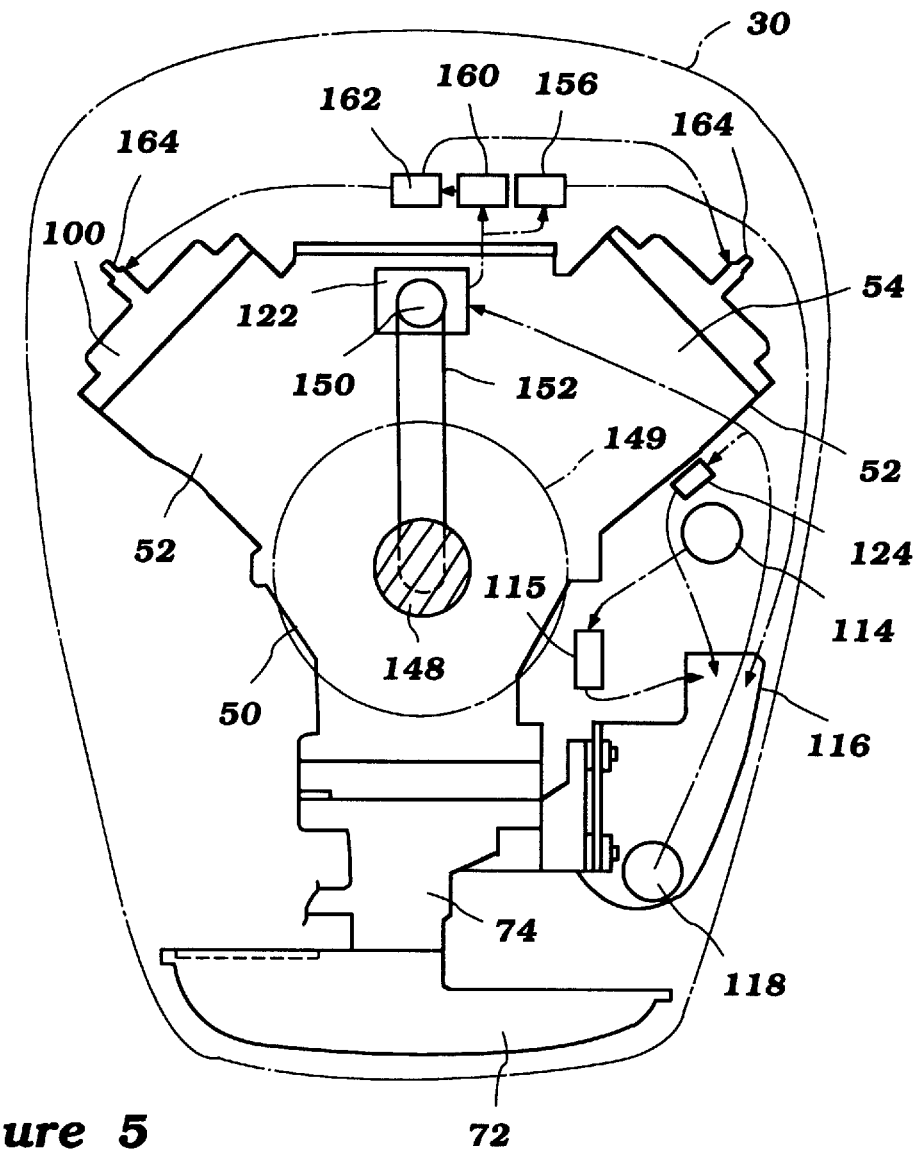
FIG. 5 is a top view of the motor illustrated in FIG. 1, illustrating the engine having a fuel supply system therein.

Referring to FIGS. 1 and 5, the engine 22 is positioned within the cowling 30 of the motor 20. As best illustrated in FIGS. 2 and 5, the engine 22 is preferably of the six-cylinder variety, operating on a two-cycle principle, and arranged in "V" fashion. In this arrangement, the engine 22 has a cylinder block 50 with a pair of cylinder heads 52 connected thereto. Each cylinder head 52 cooperates with the block 50 to define three cylinders 54. A combustion chamber 56 is defined within each cylinder 54, preferably partly by a recessed area within the cylinder head 52.

Figure 3:
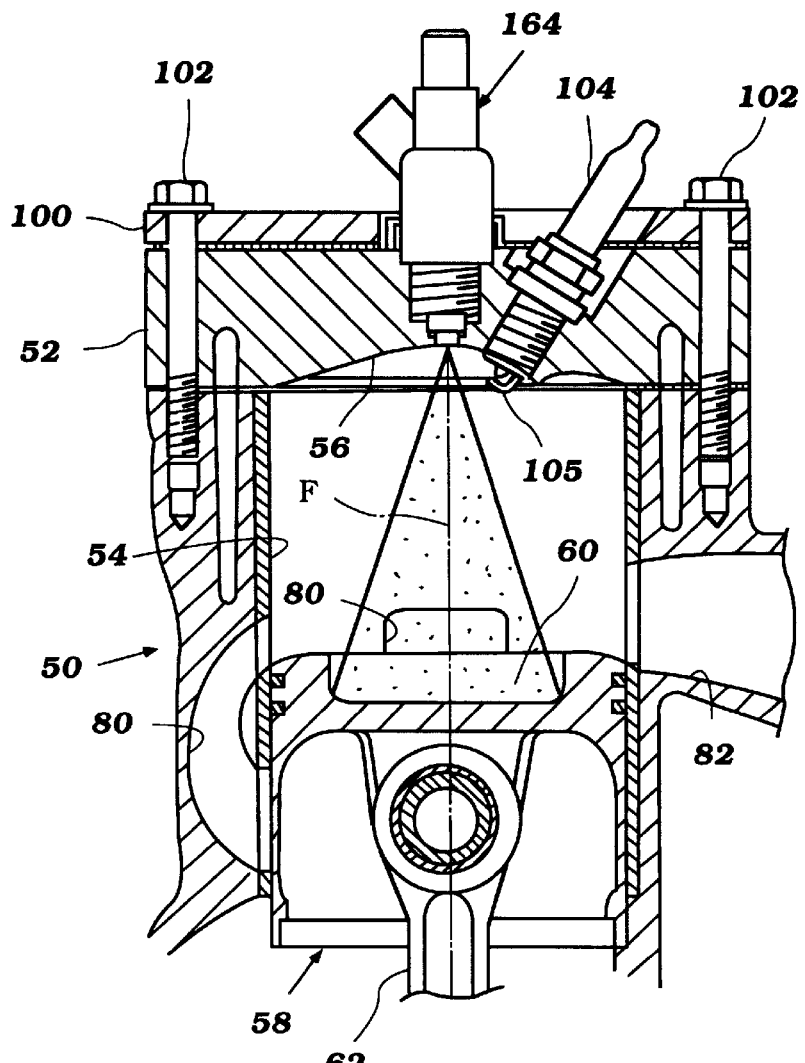
FIG. 3 is an enlarged cross-sectional view of a cylinder of the engine illustrated in FIG. 2.
Figure 4:
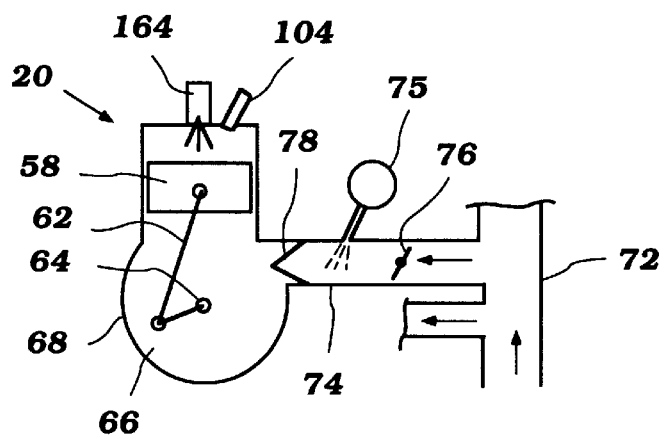
FIG. 4 is a schematic illustrating the arrangement of the engine illustrated in FIG. 2.

Referring to FIGS. 3 and 4, a piston 58 is movably mounted within each cylinder 54. The piston 58 preferably has a recessed top surface area 60 of a shape known to those skilled in the art for inducing fuel and air mixing within the cylinder 54. The piston 58 is connected by a connecting rod 62 to a crankshaft 64. The crankshaft 64 is rotatably mounted in a crankcase 66 defined by the engine block 50 and a crankcase cover 68 connected thereto.

As illustrated in FIG. 2, the engine 22 is preferably mounted within the cowling 30 so that its cylinders 54 are generally horizontally extending. So arranged, the crankshaft 64 is generally vertically extending. The crankshaft 64 is arranged to drive a means for propelling the watercraft. Preferably, this means comprises a propeller 70.

In this arrangement, the crankshaft 64 is connected to a top end of a drive shaft (not shown) which extends downwardly through the lower unit 34, where it drives a bevel gear and a conventional forward-neutral-reverse transmission. A control (not shown) is preferably provided for allowing an operator to remotely control the transmission from the watercraft 24.

The transmission drives a propeller shaft (not shown) which is journalled within the lower section 40 of the lower unit 34 in a known manner. A hub of the propeller 70 is coupled to the drive shaft, rotation of the propeller moving water which effectuates movement of the watercraft 24.

As illustrated in FIGS. 4 and 5, the engine 22 includes an intake system for providing air to each cylinder 54. The intake manifold preferably includes an air intake 72. Air is drawn from outside the cowling 30 of the motor through a vent (not shown) and into the air intake 72. Air passing through the air intake 72 is divided and passes through an intake passage 74 corresponding to each cylinder 54.

Means are provided for controlling the flow rate of air to each cylinder 54. In the present embodiment, this means comprises a throttle valve 76 movably positioned in each passage 74. Each valve 76 preferably comprises a butterfly-type valve which is controlled remotely by the operator of the watercraft 24.

Each intake passage 74 leads to a chamber within the crankcase 66 corresponding to one of the cylinders 54. A reed-valve 78 is preferably provided in each intake passage 74 for permitting only one-way passage of the air into each crankcase chamber.

Lubricant may be added to the air passing through the intake passage 74 by a lubricant delivery mechanism 75, as well known to those of skill in the art.

As stated above, the engine 22 operates on the well known two-cycle principle. As such, during a crankcase compression cycle, air within the crankcase chamber is compressed and flows through one or more scavenge passages 80 leading from the chamber into the cylinder 54.

As described in more detail below, a fuel supply system provides fuel to each cylinder 54 for combustion therein with the air supplied as stated above.

Referring to FIG. 2, exhaust generated during the combustion process is routed from each cylinder 54 through an exhaust port 82. Each exhaust port 82 comprises a passage leading through the engine block 50 from cylinder 54. The exhaust ports 82 for the cylinders 54 of each bank join into a common exhaust passage 84. The common exhaust passages 84 lead downwardly to the bottom end of the engine 22.

Means are provided for routing the exhaust from the bottom of the engine 22 to a point external to the motor 20. Preferably, the engine 22 is positioned above an exhaust guide 85 within the motor 20. A pair of passages 86 extend through the exhaust guide 85 corresponding to the common exhaust passages 84 leading through the engine 22.

A muffler 90 is positioned in the upper section 38 of the lower unit 34. An exhaust pipe 88 extends down from each passage 86 through the exhaust guide 85 into the muffler 90 for directing the exhaust into the muffler 90. Exhaust from each exhaust pipe 88 is kept separate by a divider 92, with the exhaust from each exhaust pipe 88 directed into one of two exhaust expansion areas 94 defined within the muffler 90. The exhaust is routed from the muffler 90 through an exhaust passage 96 extending through the lower section 40 of the lower unit 40 to a through the hub exhaust discharge, as is well known in the art.

As illustrated in FIG. 3, a cover 100 extends over each cylinder head 52. Bolts 102 or other fasteners are used to connect the cover 100, head 52 and block 50.

Referring to FIG. 3, means are provided for igniting the air and fuel supplied to each cylinder 54. Preferably, this means comprises a spark plug 104 having its electrode 105 positioned within the combustion chamber 56 of the cylinder 54. An ignition circuit, as is known to those skilled in the art, is provided for inducing a spark at the electrode tip 105 of the spark plug 104 at a determined time for igniting an air and fuel mixture within the cylinder 54.

In accordance with the present invention, a fuel supply system 106 provided fuel to each cylinder 54 for combustion therein. A fuel supply system 106 in accordance with a first embodiment of the invention will be described with reference initially to FIGS. 1 and 7.

The fuel supply system 106 draws fuel from a fuel supply or source, such as a fuel tank 108 or reservoir. As illustrated, the tank 108 is positioned within the hull 36 of the watercraft 24. A first low pressure or primer type pump 110 is positioned along a fuel delivery line 112 leading from the tank 108. The delivery line 112 leads to a fuel filter 114, and thereon to a second low pressure pump 115 and then a vapor separator 116. Preferably, the second pump 114 is of the electrically operated variety.

The vapor separator 116 is utilized to remove air from the fuel, as is known in the art. The fuel is then pumped by a first or pre-pressurizing pump 118 through a line 120 to a high pressure pump 122. The pump 118 is preferably of the electrically-operated type and positioned within the vapor separator 116. The first pump 118 pressurizes the fuel to a first pressure above the pressure of the fuel within the vapor separator 116.

Means are provided for cooling at least a portion of the fuel supplied to the high pressure pump 122, whereby vapor creation within the fuel during the pressurizing by the high pressure pump 122 may be minimized. Preferably, this means comprises a fuel cooler 124.

In accordance with this embodiment, a portion of the fuel delivered by the pump 118 through the line 120 is diverted through the fuel cooler 124 and returned to the vapor separator 116 through a return line 117. As illustrated, the amount of fuel diverted is determined by a setting of a pressure-regulator type check valve 126. The fuel cooler 124 thus cools fuel which is mixed with the fuel in the vapor separator 116, thus lowering the temperature of the fuel therein which is delivered to the high pressure pump 122.

Figure 6:
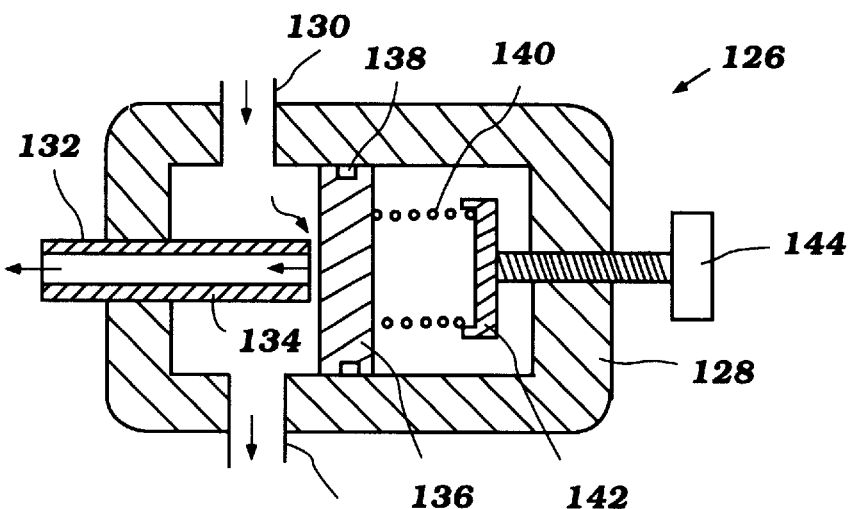
FIG. 6 is a cross-sectional view of a check valve of the fuel supply system of the engine illustrated in FIG. 1.

The valve 126 controlling the amount of fuel diverted through the fuel cooler 124 is illustrated in more detail in FIG. 6. As illustrated therein, the valve 126 has a body 128 defining a chamber having at least one inlet 130 and an outlet 132. The outlet 132 is defined by a pipe 134 extending into the chamber. A piston member 136 is movably positioned in the chamber adjacent an end of the pipe. The piston 136 is sealed by an O-ring 138 or similar seal, preventing fuel from flowing therepast to the portion of the chamber on the opposite side thereof.

The piston 136 is biased in the direction of the end of the pipe 134 by a spring 140. An opposite end of the spring 140 is positioned against a retainer 142 mounted on the end of an adjuster 144. The spring 140 presses the piston 136 in the direction of the end of the pipe 134, thereby having the natural tendency to close the end of the pipe 134 and prevent the flow of fuel from the inlet 130 through the chamber and out the outlet, in which case the fuel may be returned to the supply through an alternative relief outlet 146.

When the fuel pressure within the chamber reaches a sufficient level, the spring force is overcome and the piston 134 is moved from the end of the pipe 134, permitting fuel to flow through the outlet 132 (and, for example, to the vapor separator 118).

The adjuster 144, which threadingly engages the housing 128, may be used to move the retainer 142 towards and away from the end of the pipe 134. As may be understood, the closer the retainer 142 is moved to the end of the pipe 134, the greater the spring force and thus the higher the fuel pressure which must be achieved to permit flow through the outlet 132.

Figure 7:
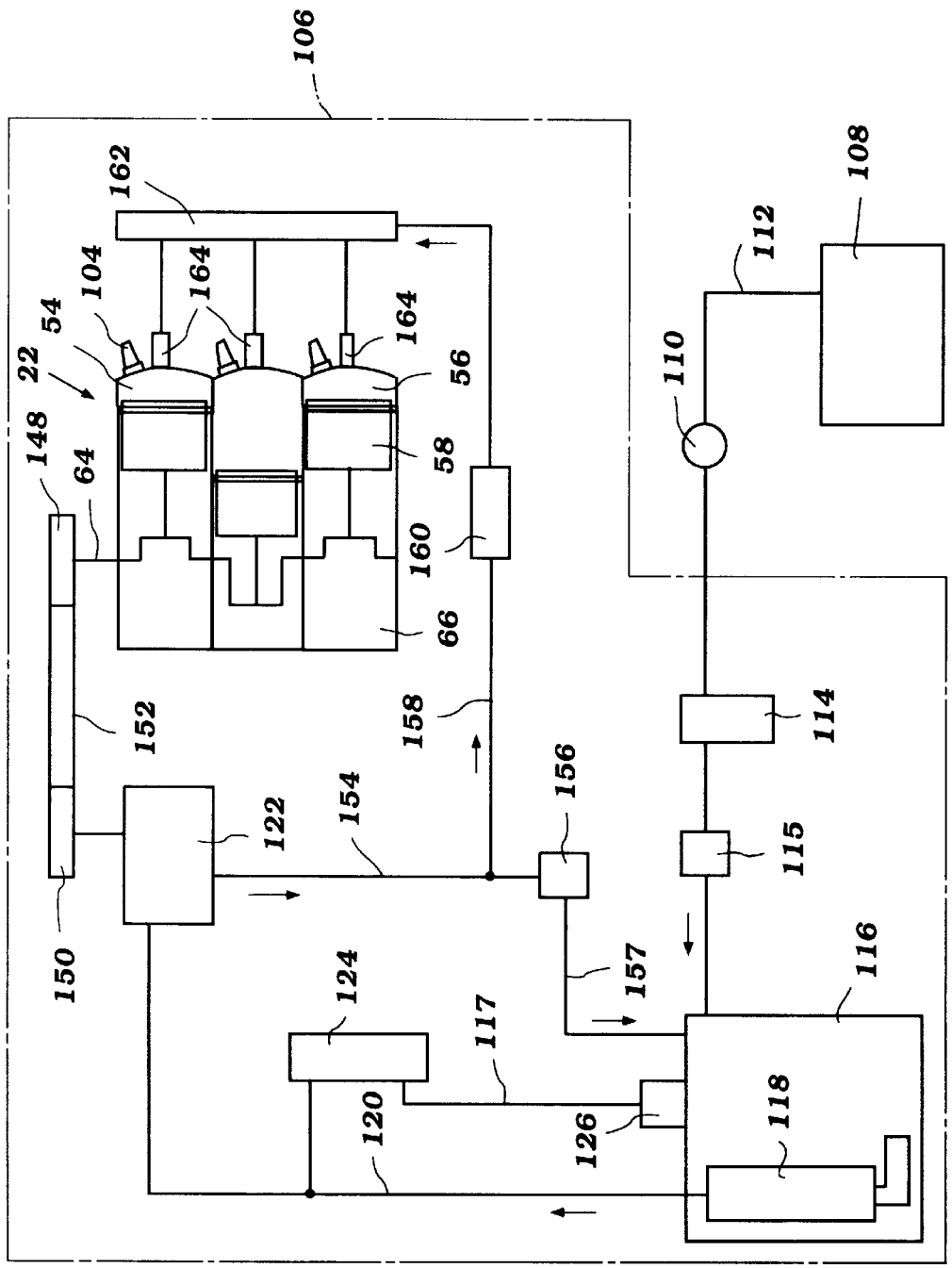
FIG. 7 is a schematic illustrating a fuel supply system in accordance with a first embodiment of the present invention.

As illustrated in FIGS. 5 and 7, the high pressure fuel pump 122 is preferably driven by the crankshaft 64 of the engine 22. In particular, a drive pulley 148 is mounted on the crankshaft 64 above a flywheel 149. A similar pulley 150 is positioned on a drive shaft of the pump 122. A belt 152 extends between the pulleys 148,150, whereby the drive pulley 148 drives the pump 122.

The pump 122 pressurizes the fuel to a second pressure above the first pressure and delivers it through a line 154. In accordance with the present invention, a portion of the fuel supplied by the pump 122 is returned back to the vapor separator 116. Preferably, the fuel is diverted by a pressure activated valve 156 back to the vapor separator 116 through a line 157. This valve 156 is similar to that illustrated in FIG. 6 and described above.

The remainder of the fuel is delivered through a main delivery line 158 through a fuel filter 160 to a high pressure fuel rail 162. A fuel injector 164 is provided corresponding to each cylinder 54, as illustrated in FIG. 3, and is arranged to spray fuel F into the cylinder 54. The fuel injector 164 is arranged to draw fuel from the fuel rail 162.

In accordance with the fuel supply system 106 of the present invention the pump 118 pre-pressurizes the fuel, so that the high pressure pump 122 need not further pressurize the fuel in as great of a pressure rise to reach the desired fuel supply pressure. Because the degree to which the high pressure pump 122 must pressurize the fuel is reduced, the amount of vapor produced during the pressurizing step is minimized.

In addition, the fuel cooler 124 lowers the temperature of the fuel flowing through the fuel system. Less vaporization or air-entry into the low temperature fuel occurs.

In this embodiment, the valve 156 diverts a portion of the fuel back to the vapor separator 116. The valve 156 is useful in diverting what little vapor may be present in the system back to the separator 116 for separation, with the remaining fuel being delivered to the fuel injectors 164.

Figure 8:
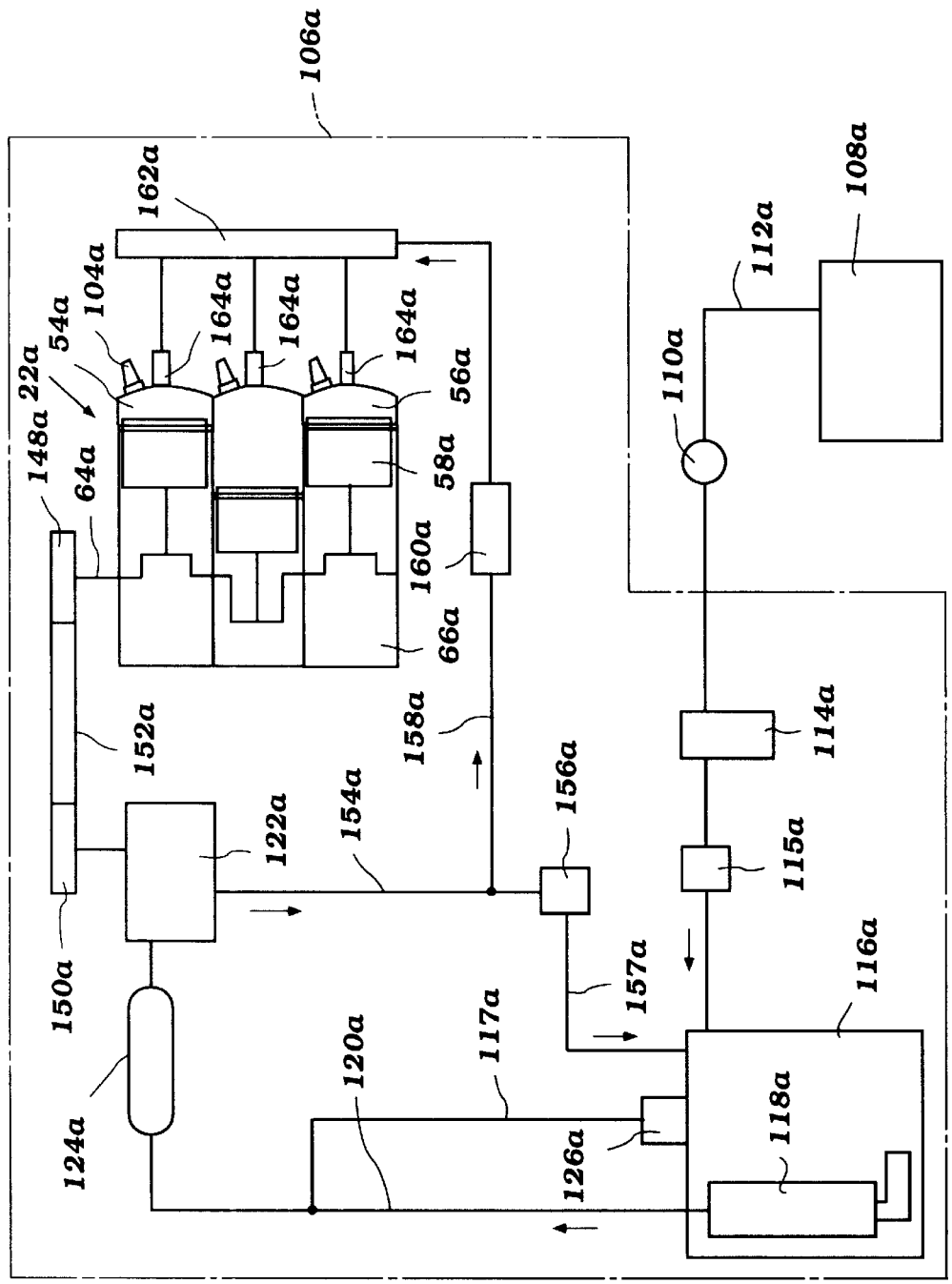
FIG. 8 is a schematic illustrating a fuel supply system in accordance with a second embodiment of the present invention.

A second embodiment fuel supply system 106a is illustrated in FIG. 8. In the description and illustration of this embodiment, similar parts have been given like reference numerals to those used in the embodiment described above and illustrated in FIGS. 1–7, except that an "a" designator has been added thereto.

As illustrated, this embodiment system is similar to the last. In this embodiment, however, a portion of the fuel delivered by the pump 118a through the line 120a is returned directly back to the vapor separator 116a (as governed by a valve 126a) without passing through a fuel cooler. Instead, a fuel cooler 124a is positioned along the portion of the line 120a leading to the high pressure pump 122a, cooling the fuel which is delivered directly thereto.

In addition to those advantages described above, this embodiment fuel supply system 106a has the further advantage that all of the fuel delivered to the high pressure pump 122a is cooled.

Figure 9:
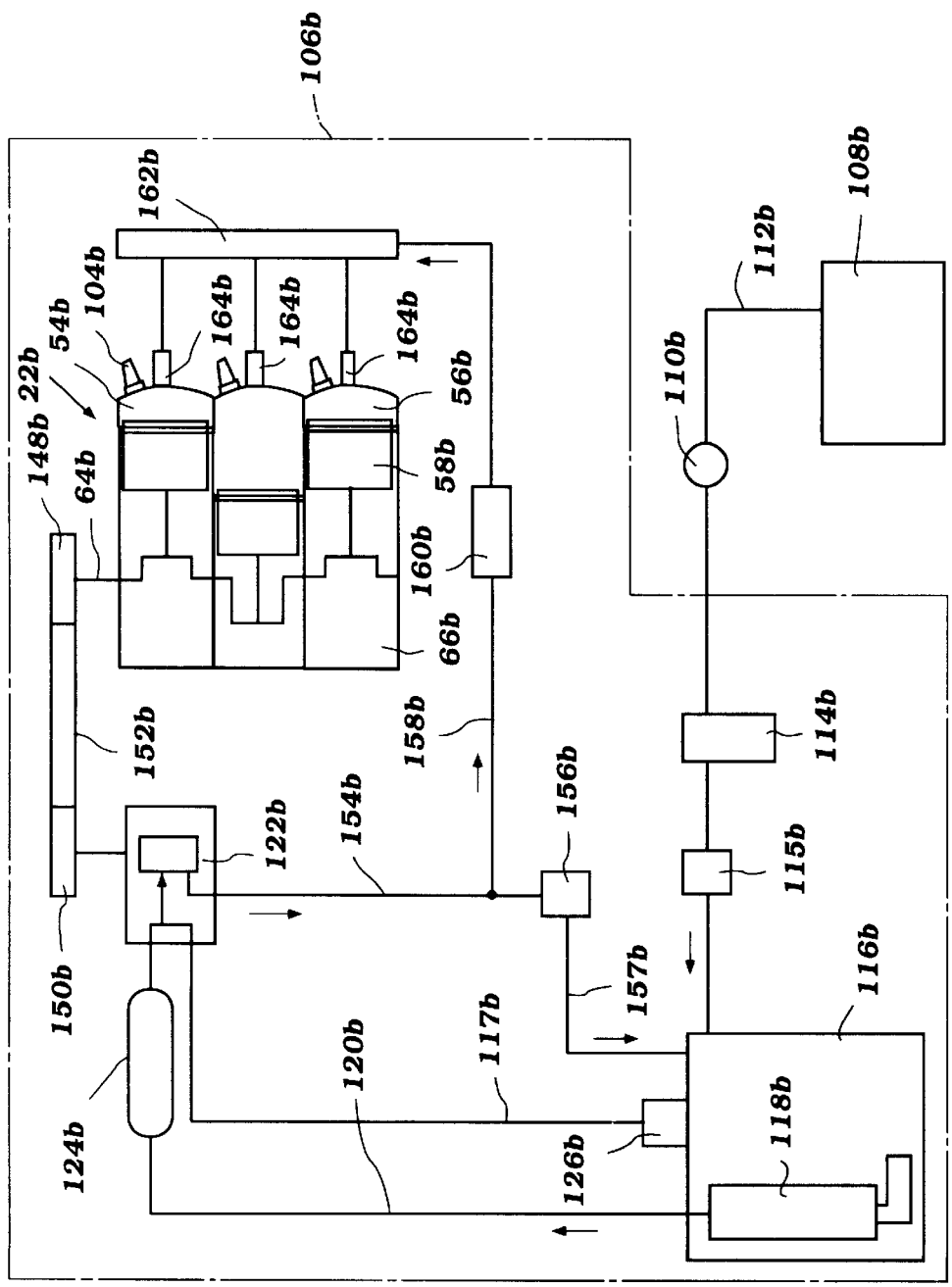
FIG. 9 is a schematic illustrating a fuel supply system in accordance with a third embodiment of the present invention.

A third embodiment fuel supply system 106b is illustrated in FIG. 9. In the description and illustration of this embodiment, similar parts have been given like reference numerals to those used in the above embodiments illustrated in FIGS. 1–8, except that a "b" designator has been added thereto.

In this embodiment, the fuel pump 118b delivers fuel through a fuel line 120b to a fuel cooler 124b and thereon to the high pressure fuel pump 122b. In this embodiment, a portion of the fuel delivered to the pump 122b is diverted back to the vapor separator 116b through a return line. The amount of fuel returned is governed by a valve 126b similar to that described above and illustrated in FIG. 6.

This embodiment fuel supply system 106b has the advantage that vapor within the fuel delivered to the high pressure pump 122b is diverted back to the vapor separator 116b before being further pressurized by the high pressure pump 122b.

Figure 10:
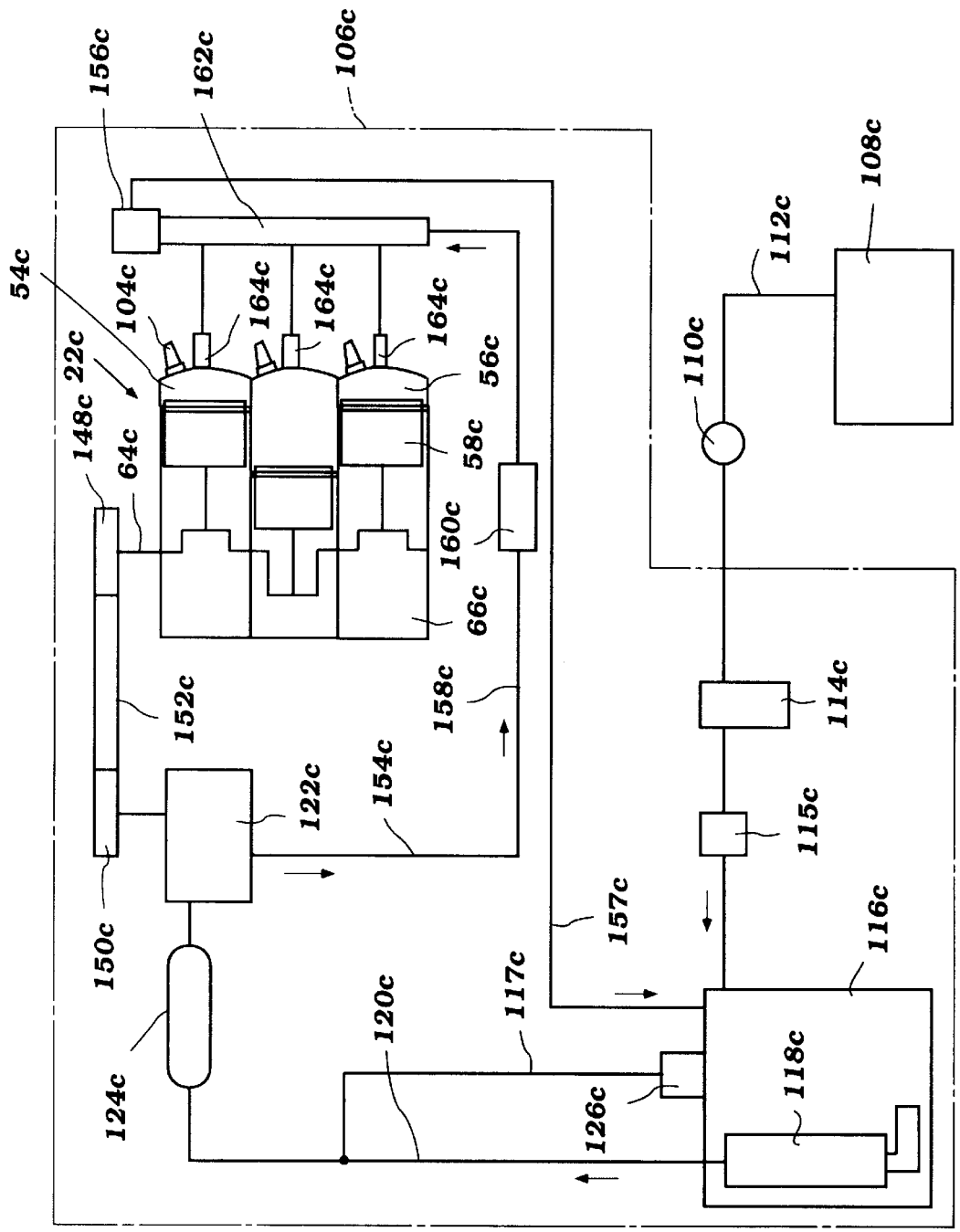
FIG. 10 is a schematic illustrating a fuel supply system in accordance with a fourth embodiment of the present invention.

A fourth embodiment fuel supply system 106c is illustrated in FIG. 10. In the description and illustration of this embodiment, similar parts have been given like reference numerals to those used in the above embodiments, except that a "c" designator has been added thereto.

This embodiment is similar to that illustrated in FIG. 8, that a fuel return is provided after the fuel rail 162c. In particular, fuel is delivered through the fuel line 154c from the high pressure pump 122c through the filter 160c to the fuel rail 162c. Fuel which is delivered to the rail, but not delivered by the injectors 164c is selectively returned to the vapor separator 116c through a return line. A valve 156c is preferably positioned at the end of the fuel rail 162c for controlling the pressure in the rail and the amount of fuel returned to the separator 116c.

In addition to the advantages described above, this embodiment has the further advantage that the valve 156c which is used to return a portion of the fuel to the vapor separator 116c is also utilized to control the pressure within the fuel rail 162c.

Figure 11:
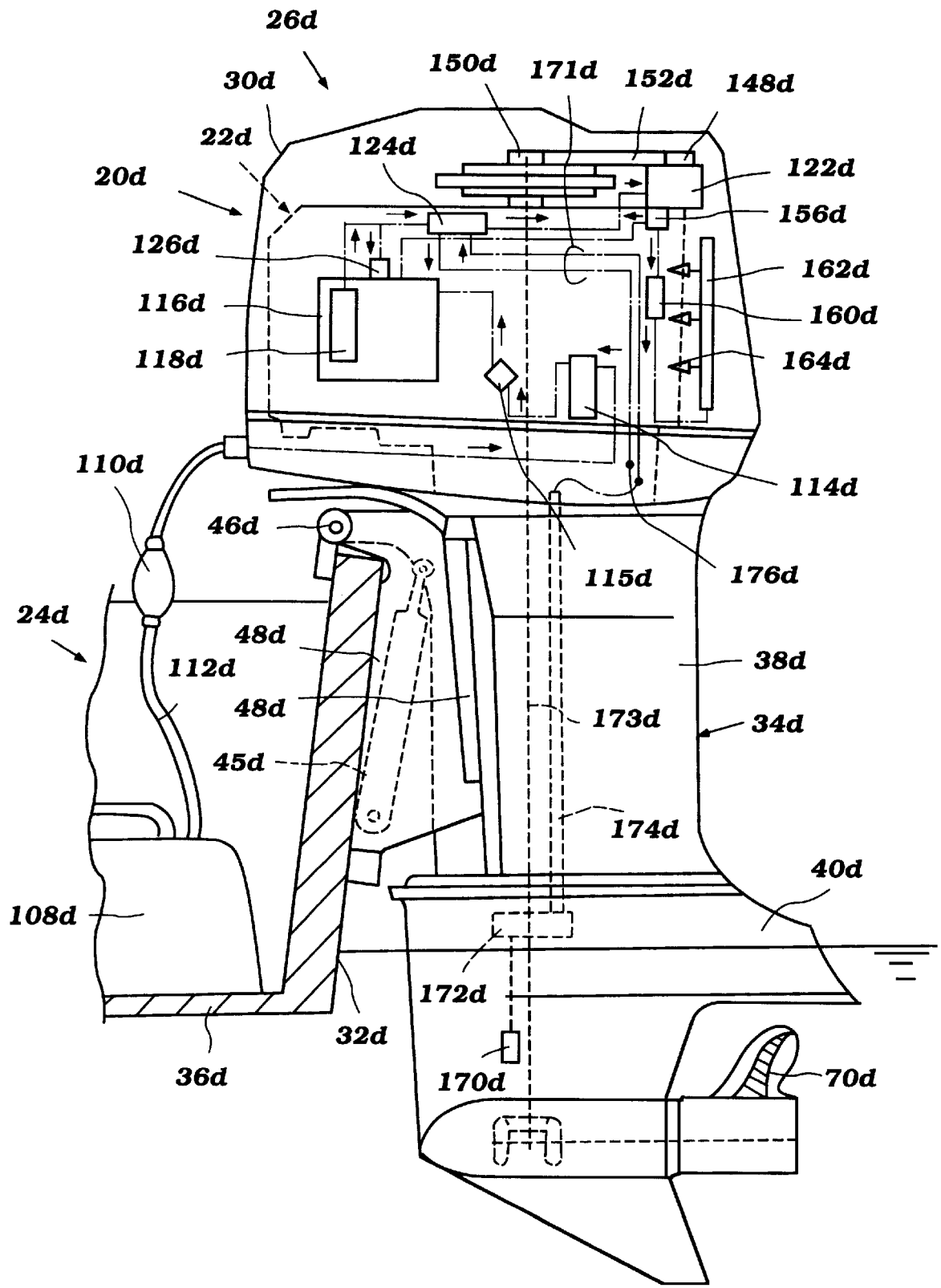
FIG. 11 is a side view of an outboard motor powered by an engine having a fuel supply system in accordance with the present invention and including a first embodiment fuel cooling arrangement.

FIG. 11 illustrates an outboard motor 20d having a fuel supply system 106d with a specific fuel cooling arrangement. With the exception of the fuel cooling arrangement, the fuel supply system 106d is similar to that illustrated in FIG. 8. Like reference numerals are used with to designate similar parts in the description and illustration of this embodiment to those of the embodiment illustrated in FIG. 8, except that a "d" designator has been added thereto.

In this embodiment, the fuel is cooled in the fuel cooler 124d by cooling water drawn from the body of water in which the motor 20d is operating.

As illustrated, cooling water is drawn through an inlet 170d in the motor 20d by a pump 172d. The pump 172d is preferably powered off of a drive shaft 173d extending between the crankshaft of the engine 22d and the transmission. Water is delivered through a delivery line 174d through one or more coolant passages 171d to the fuel cooler 124d. This water is used to cool the fuel passing through the fuel cooler 124d, and then is drained back to the body of water in which the motor 20d is operating through one or more coolant passages 171d leading to a drain port 176d.

This arrangement has the advantage that the fuel is cooled before delivery to the fuel injectors 164d. In addition, since most outboard motors have their engines provided with a liquid cooling system already, simply by providing a small amount of this coolant to a fuel cooler, the fuel cooling advantages are achieved.

Figure 12:
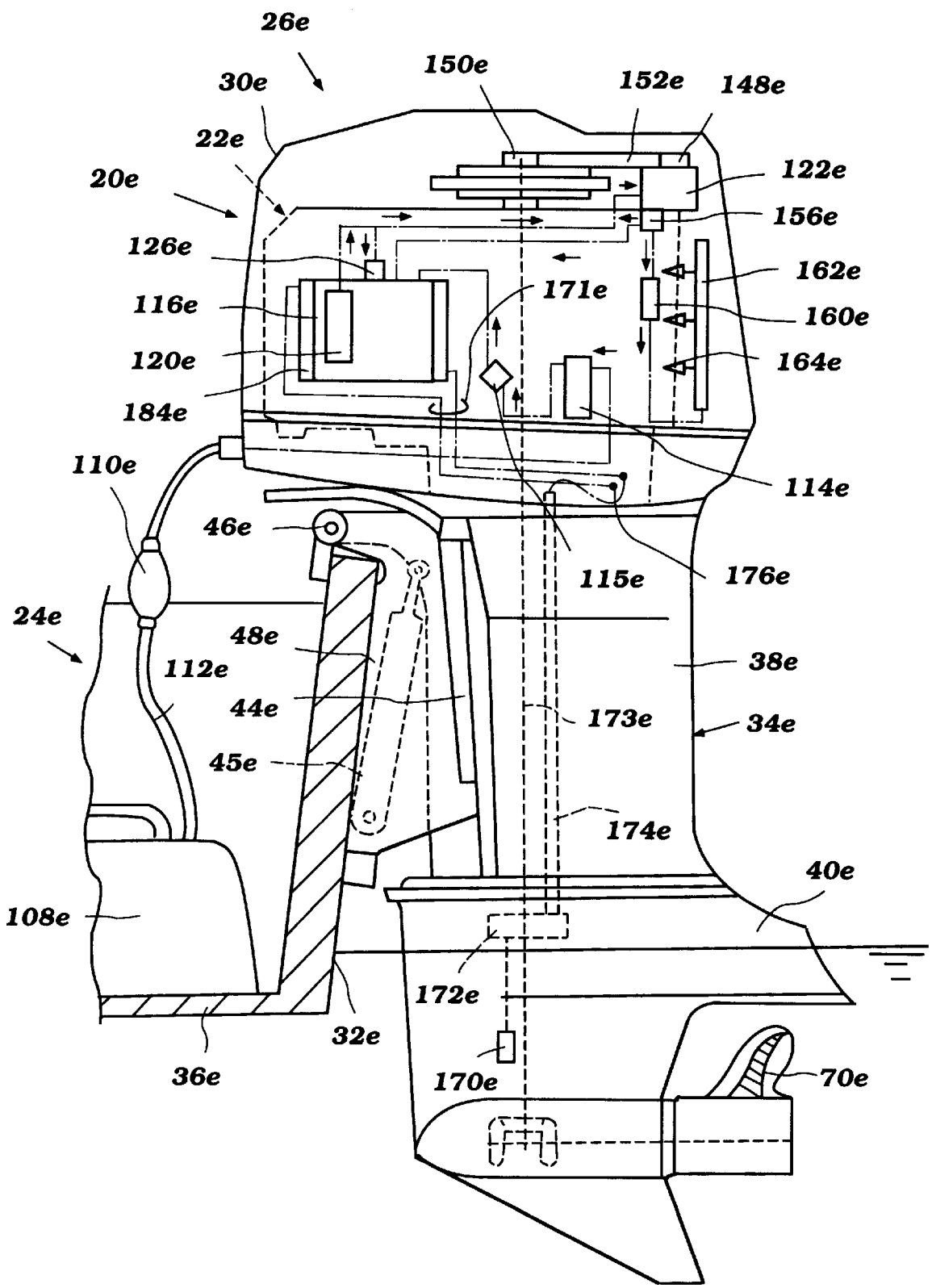
FIG. 12 is a side view of an outboard motor powered by an engine having a fuel supply system in accordance with the present invention and including a second embodiment fuel cooling arrangement.
Figure 13:
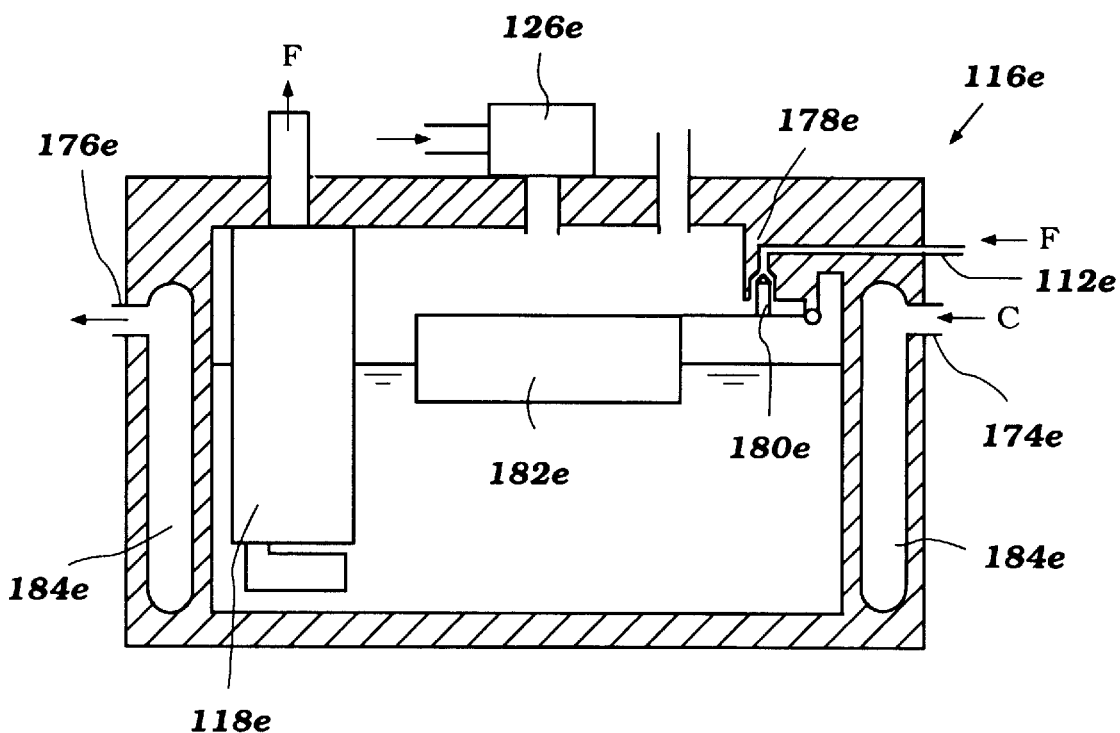
FIG. 13 is a cross-sectional view of a vapor separator and fuel cooler of the fuel supply system with fuel cooling arrangement illustrated in FIG. 12.

Another fuel cooling arrangement is illustrated in FIGS. 12 and 13. In the description and illustration of this embodiment, like reference numerals have been utilized for like parts to those of the embodiments described and illustrated above, except than an "e" designator has been added thereto.

In this embodiment, the fuel is cooled within the vapor separator 116e. In this arrangement, the separator 116e includes a housing 178e. Fuel is delivered through the fuel line 112e to the separator 116e. Preferably, the rate of fuel delivery is controlled by a control pin 180e actuated by a float 182e in the separator 116e. When the separator 116e is full, the float 182e rises upwardly, forcing the pin 180e upwardly as well, blocking the incoming fuel line.

A water or cooling jacket 184e is formed within the body 178e of the separator 116e. Coolant "C" is delivered through the delivery line 174e into the jacket 184e. The coolant flows through the jacket 184e, cooling the fuel within the separator 116e, and then flows out an outlet to the discharge port 176e, as described above.

Like the last embodiment, this embodiment has the advantage that fuel cooling can be achieved with little modification to the outboard and engine motor, in that most motors already generally include water cooling systems for their engine. In addition, in this embodiment, the fuel cooler is incorporated into the vapor separator, eliminating the need for a separate space consuming fuel cooler.

A fifth embodiment fuel supply system 106f is illustrated in FIGS. 14–19. In the description and illustrations of this embodiment, similar parts have been given like reference numerals to those used in the above embodiments, except that an "f" designator has been added thereto.

In this embodiment, the fuel which is delivered by the pre-pressurizing pump 118f is delivered through a line 119f which connects to the line 120*f* leading to the high pressure pump 122*f*. As illustrated, the line 119*f* intersects the line 120*f* between a pressure regulating check valve 126*f* and the pump 122*f*, the valve 126*f* arranged to route fuel back to the vapor separator 116*f* in the event the fuel pressure in the lines 119*f*,120*f* becomes too high.

This embodiment fuel supply system 106*f* is similar to that illustrated in FIG. 8, except that a fuel cooler is not provided and but instead a vapor relief line 190*f* extends from the vapor separator 116*f* to the air intake passages 74*f*. The vapor relief line 190*f* delivers fuel vapor to the air passing through the passages 74*f* for combustion in the engine 22*f*.

In addition, a lubricant delivery system provides lubricant to the intake system and fuel supply system 106*f* of the engine 22*f*. As illustrated, lubricant is delivered from a supply 192*f* through a supply line 194*f* to the intake passages 74*f*.

Figure 14:
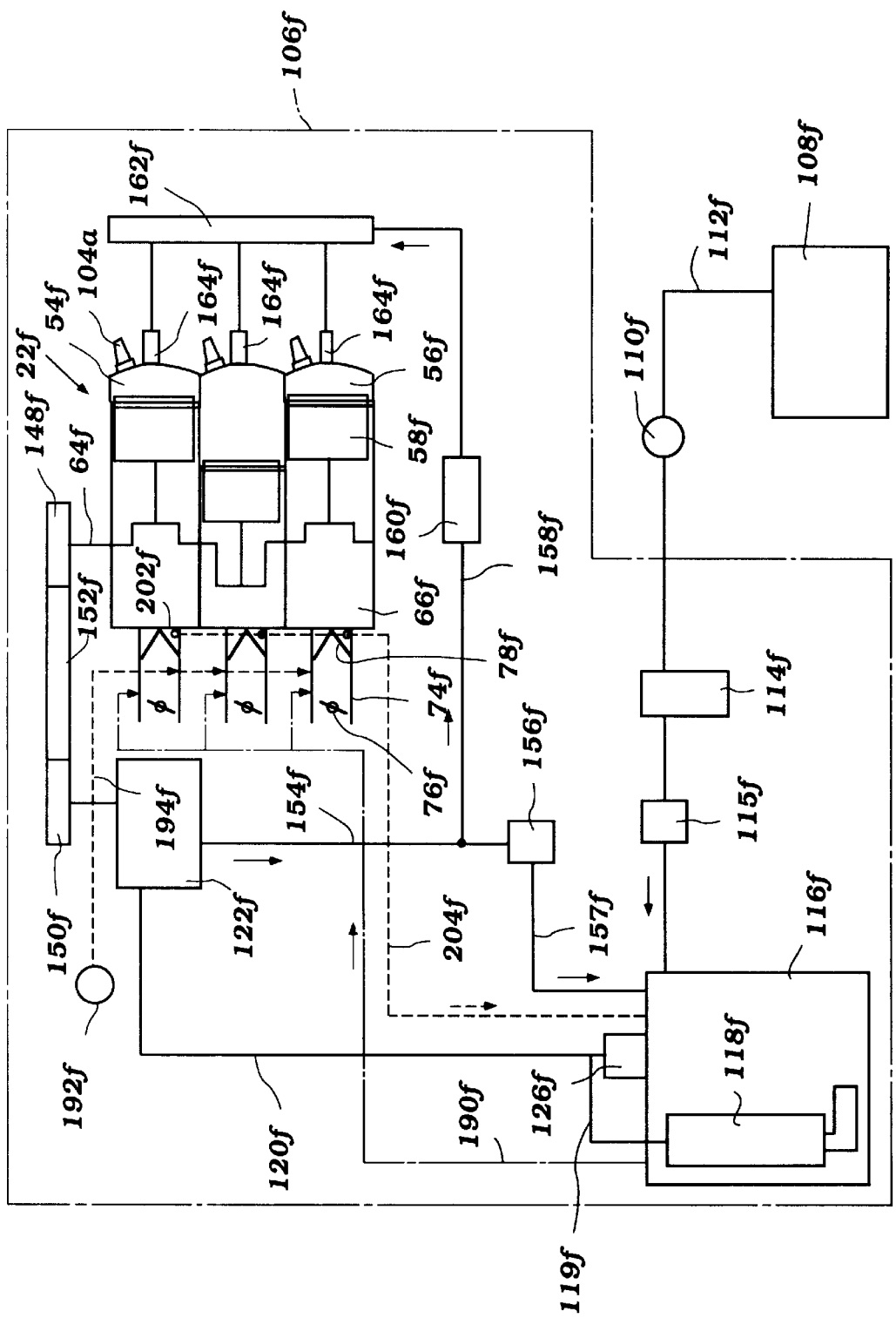
FIG. 14 is a schematic illustrating a fuel supply system in accordance with a fifth embodiment of the present invention.
Figure 15:
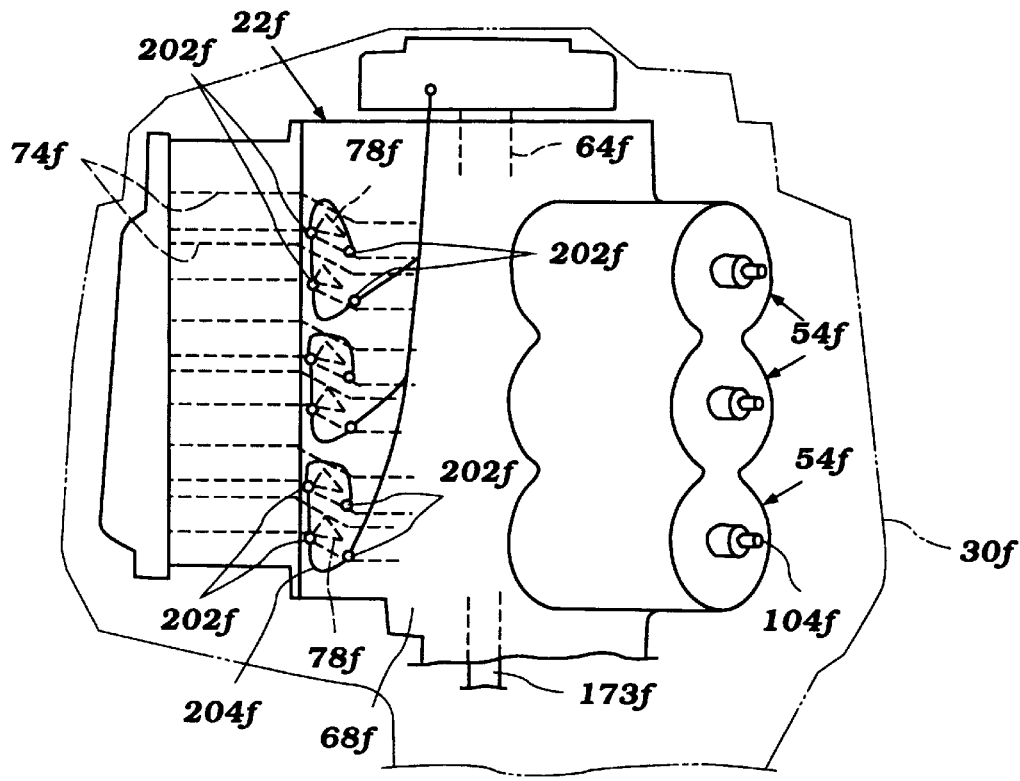
FIG. 15 is a side view of an outboard motor including an engine positioned in a cowling (illustrated in phantom) and including the fifth embodiment fuel supply system.
Figure 16:
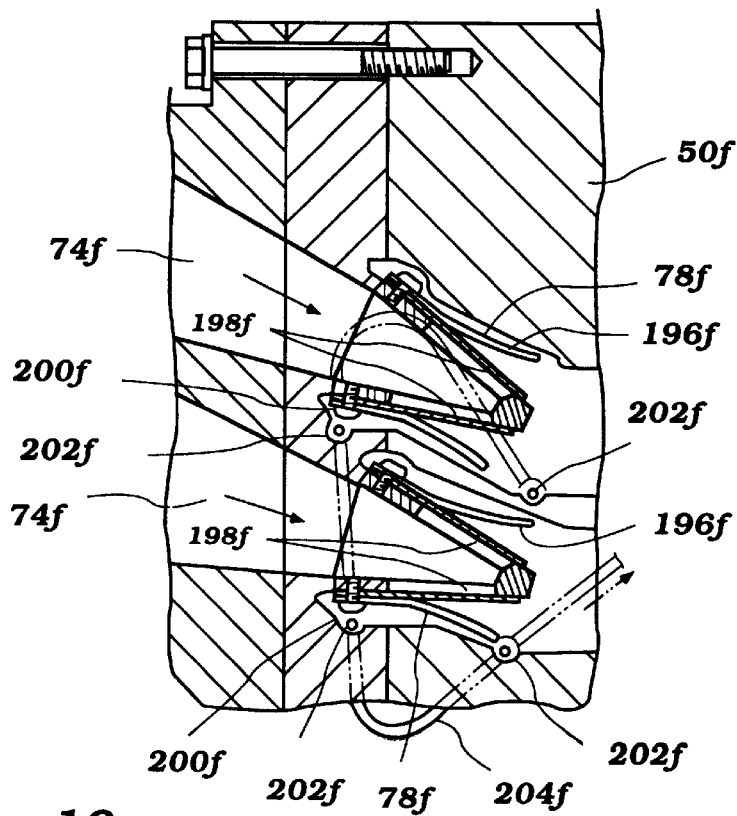
FIG. 16 is a partial cross-sectional view of the engine illustrated in FIG. 15.

Referring to FIGS. 14–16, some of the lubricant which is delivered to the intake passages 74*f* does not flow directly to the engine 22*f* but is instead routed to the vapor separator 116*f* for mixing with the fuel.

As illustrated in FIG. 16, each reed valve 78*f* comprises a valve member 196*f* positioned between an inner support 198*f* and an outer support 200*f*. The construction of these types of valves 78*f* is well known.

A lubricant pool 202*f* is provided in at least one location in each intake passage 74*f*. Preferably, a lubricant pool 202*f* is provided near a front end of each reed valve 78*f* and downstream of each reed valve 78*f*. The lubricant pools 202*f* comprise channels or slots in the lower surface of the intake passage 74*f*.

Each lubricant pool 202*f* is in communication with a lubricant passage 204*f*. Lubricant which is trapped in the pools 178*f* is drawn through the passage 180*f* to the vapor separator 116*f*, as illustrated in FIG. 14. The lubricant mixes with the fuel therein, and is delivered to the engine 22*f* through the fuel supply system 106*f*, including the fuel injectors 164*f*. This lubricant maintains the fuel injectors 164*f* free of corrosion.

Figure 17:
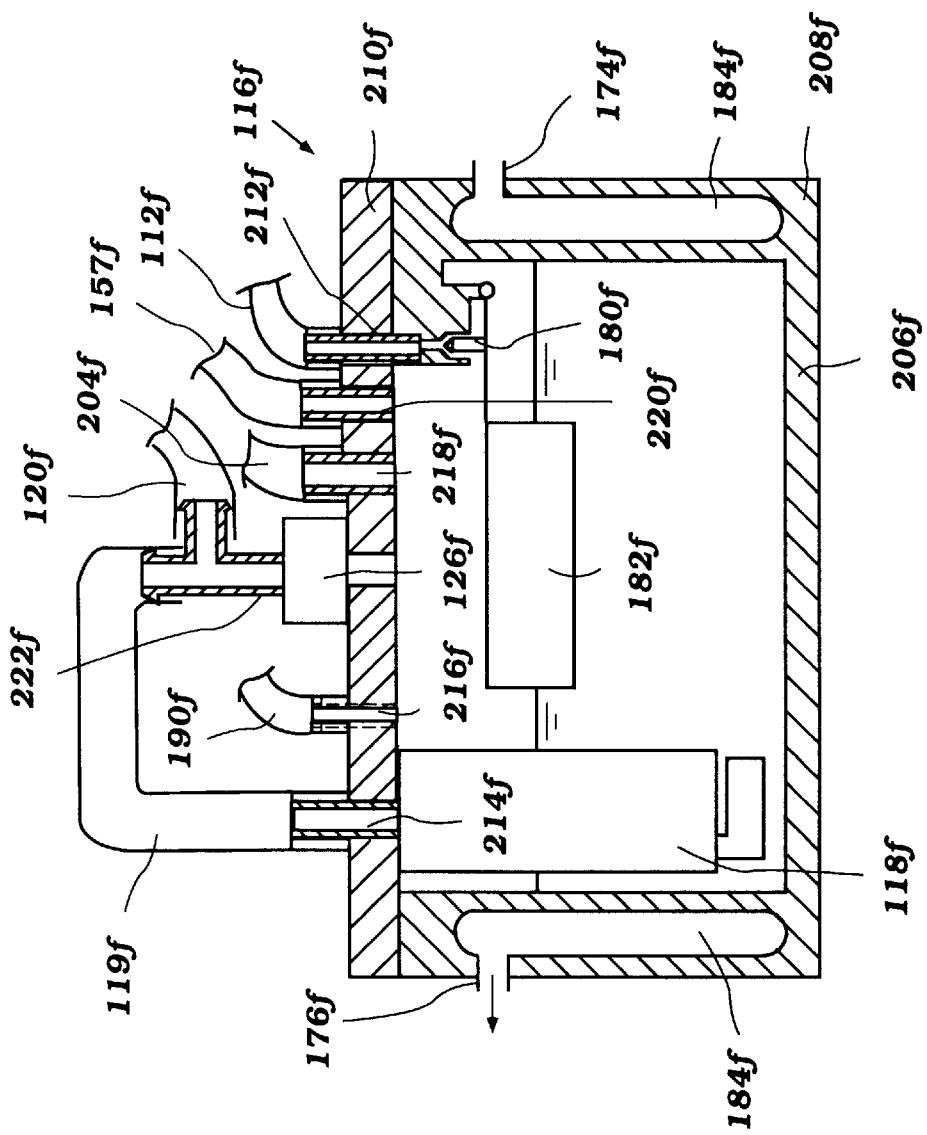
FIG. 17 is a cross-sectional view of a vapor separator and fuel cooler of the fifth embodiment fuel supply system of the present invention.

The arrangement of the vapor separator 116*f* of this embodiment fuel supply system 106*f* is illustrated in FIG. 17. The vapor separator 116*f* comprises a body 206*f* defining a fuel chamber. The body 206*f* is comprised of a base 208*f* having a lid 210*f* removably connected thereto.

The fuel supply line 112*f* is connected to a nipple 212*f* extending from the lid 210*f*. Likewise, the fuel line 119*f*, vapor line 190*f*, return line 157*f* and lubricant line or passage 204*f* are all connected to similar nipples 214*f*, 216*f*, 218*f*, 220*f*, respectively. Like the embodiment vapor separator 116*e* illustrated in FIG. 13, this embodiment vapor separator 116*f* preferably includes a coolant jacket 184*f* formed in the base 208*f* through which coolant passes for cooling the fuel therein.

As also illustrated in FIG. 17, the connection between the fuel line 119*f* and line 120*f* may comprise a "T"-fitting 222*f* which is connected to a hose comprising the lines 119*f*,120*f*, and which is also connected to the valve 126*f*.

Figure 18:
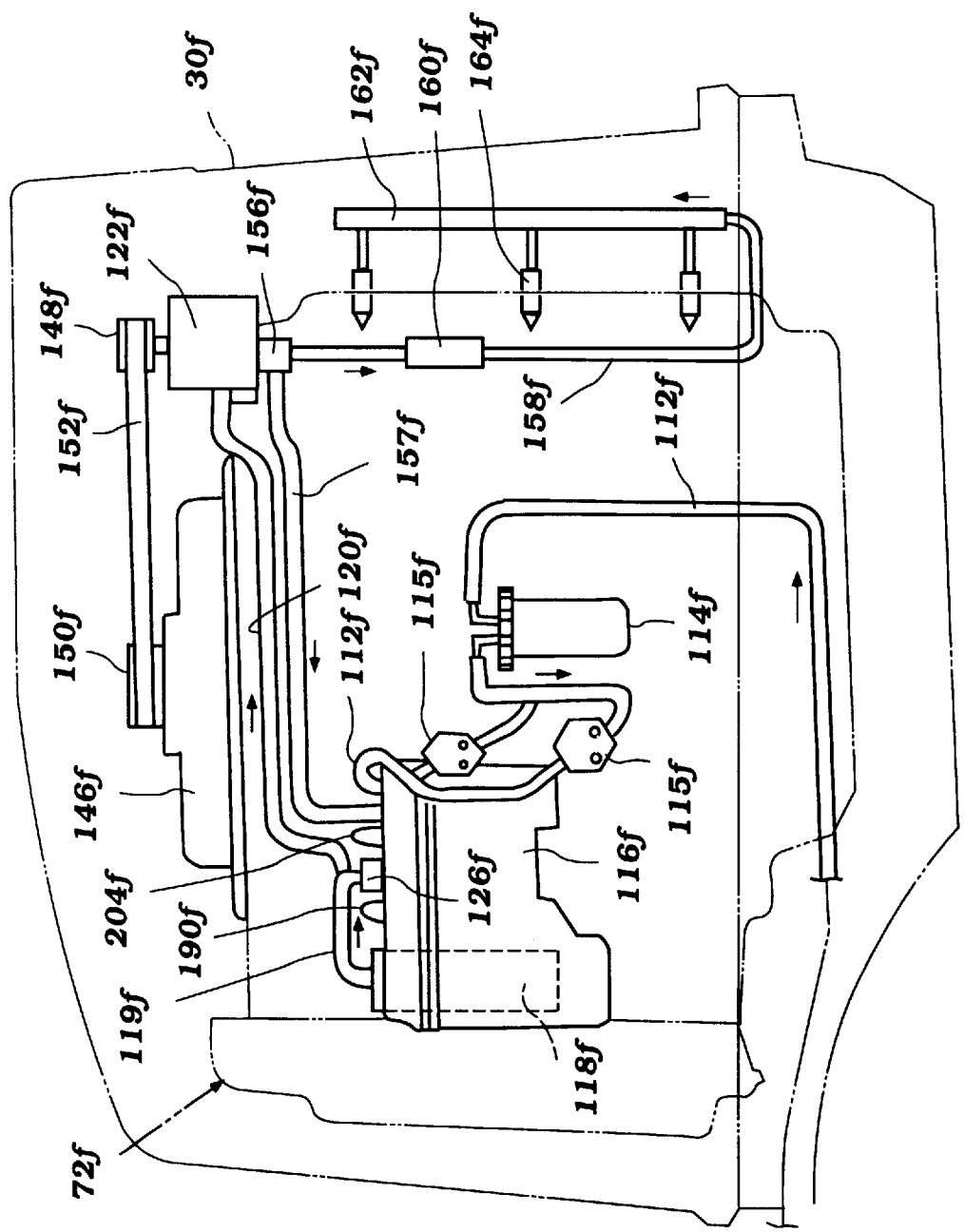
FIG. 18 illustrates components of the fifth embodiment fuel system positioned within the cowling of the motor illustrated in FIG. 15.
Figure 19:
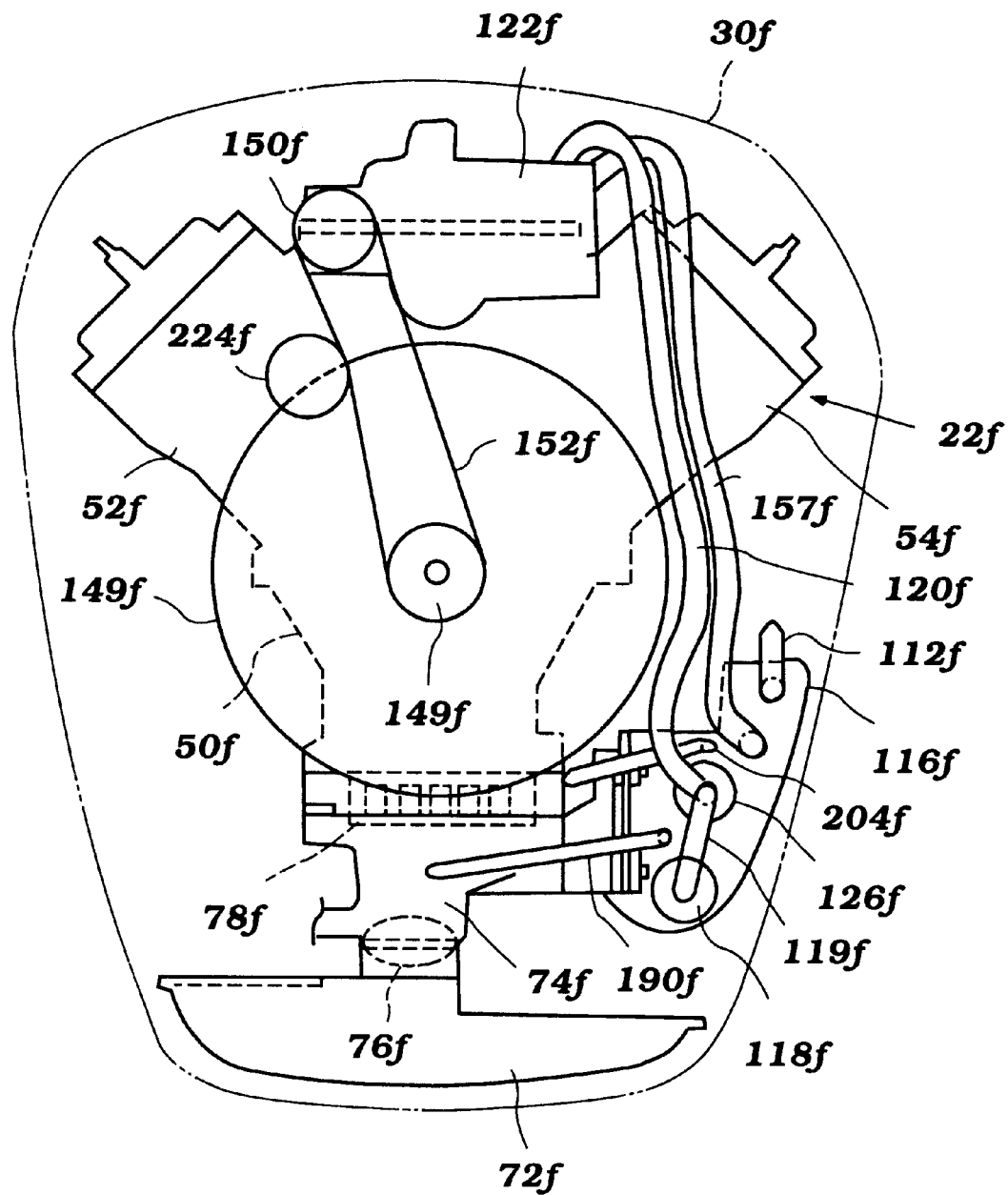
FIG. 19 is a top view of the outboard motor illustrated in FIG. 18, with a cowling thereof illustrated in phantom.

FIGS. 18 and 19 best illustrate the layout of the fuel supply system 106*f* components of this embodiment of the invention. As illustrated, the components are primarily located in a space along the side of the engine 22*f* near the air intake 72*f*. This arrangement permits the engine 22*f* to have a small size and helps keep the fuel system cool. Referring to FIG. 19, an idler pulley 224*f* is used to tension the drive belt 152*f* which drives the high pressure pump 150*f*.

Figure 20:
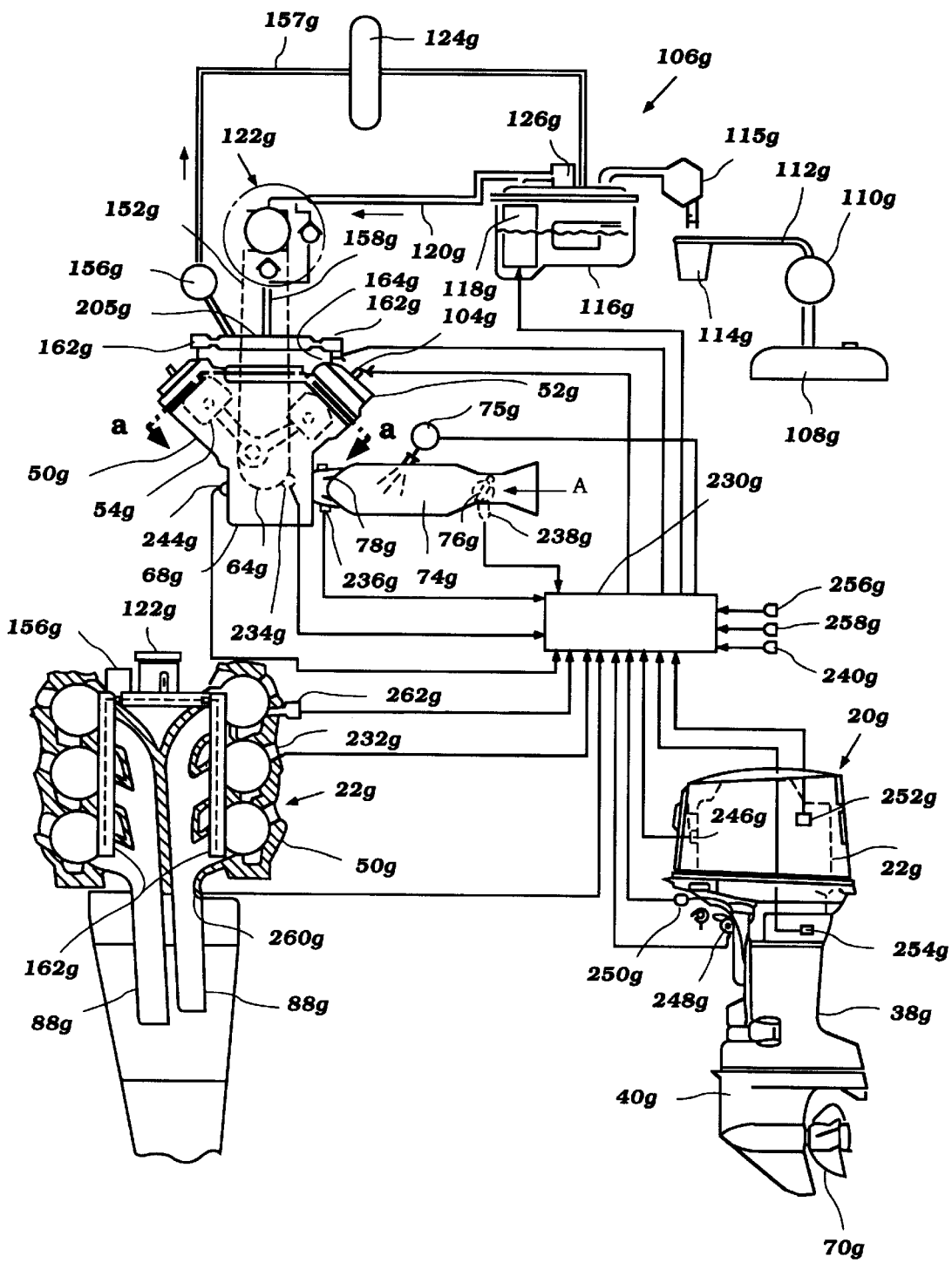
FIG. 20 schematically illustrates a fuel supply system in accordance with a sixth embodiment of the present invention used to supply fuel to an engine powering an outboard motor, the engine illustrated in a plan view and in a cross-sectional view taken along line a—a of the plan view, and illustrating the outboard motor in a side view.

A sixth embodiment fuel supply system 106*g* is illustrated in FIG. 20. In the description and illustration of this embodiment, similar parts have been given like reference numerals to those used in the above embodiments, except that a "g" designator has been added thereto.

In this embodiment, the engine 22*g* is of the "V"-type, having a two cylinder heads 52*g* connected to the single cylinder block 50*g* and cooperating therewith to define to banks of cylinders 54*g*. In the embodiment illustrated, each bank contains three cylinders 54*g*, but the banks may contain a greater or lesser number of cylinders as well known to those of skill in the art.

The fuel supply system 106*f* is similar to that illustrated in FIG. 10, except that a fuel cooler 124*g* is provided along a return line 157*g* instead of between the pre-pressurizing and high pressure pumps as illustrated in FIG. 10. In addition, a fuel rail 162*g* is provided corresponding to each cylinder bank, with each fuel rail 162*g* supplying fuel to a fuel injector 164*g* corresponding to each cylinder 54*g* of that bank.

Fuel is delivered from the high pressure pump 122*g* through a high pressure line 158*g*. This line 158*g* splits or bifurcates into a pair of feed lines 205*g*. Each feed line 205*g* leads to one of the fuel rails 162*g*. Fuel which is delivered to the fuel rails 162*g* but not delivered by the injectors 164*g* selectively passes through the valve 156*g* and through the return line 157*g* back to the vapor separator 116*g*.

As stated above, a fuel cooler 124*g* is provided along this return line 157*g* for cooling the fuel and reducing its vapor content before it is returned to the vapor separator 116*g*. Of course, this cooler fuel also reduces the temperature of the fuel already in the separator 116*g*. As illustrated, an electronic engine control unit or "ECU" 230*g* is used to control various of the engine components. The ECU 230*g* receives information from various sensors for use in controlling the engine 22*g*.

These sensors include an engine temperature sensor 232*g*, a crankshaft rotational position sensor 234*g*, an intake air temperature sensor 236*g*, a throttle position sensor 238*g*, an ambient air pressure sensor 240*g*, a crankcase chamber pressure sensor 244*g*, an engine vibration sensor 246*g*, a motor trim position sensor 248*g*, a motor height position sensor 250*g*, a cooling water temperature sensor 252*g*, a transmission position or neutral sensor 254*g*, a watercraft speed sensor 256*g*, a watercraft position sensor 258*g*, an exhaust backpressure sensor 260*g*, and an exhaust content or oxygen sensor 262*g*. Other sensors may also be provided.

Based on the various information received from the sensors, the ECU 230*g* controls the timing of the firing of the spark plugs 104*g*, and where the fuel injectors 164*g* include an electrically powered solenoid and are not solely pressure-operated, the opening and closing of the injectors 164*g*. The ECU 230*g* may be used to control a wide variety of other components or engine functions, such as the pre-pressurizing pump 118*g* (when electrically powered). These types of controls are well known to those of skill in the art and may vary from that described above.

Figure 21:
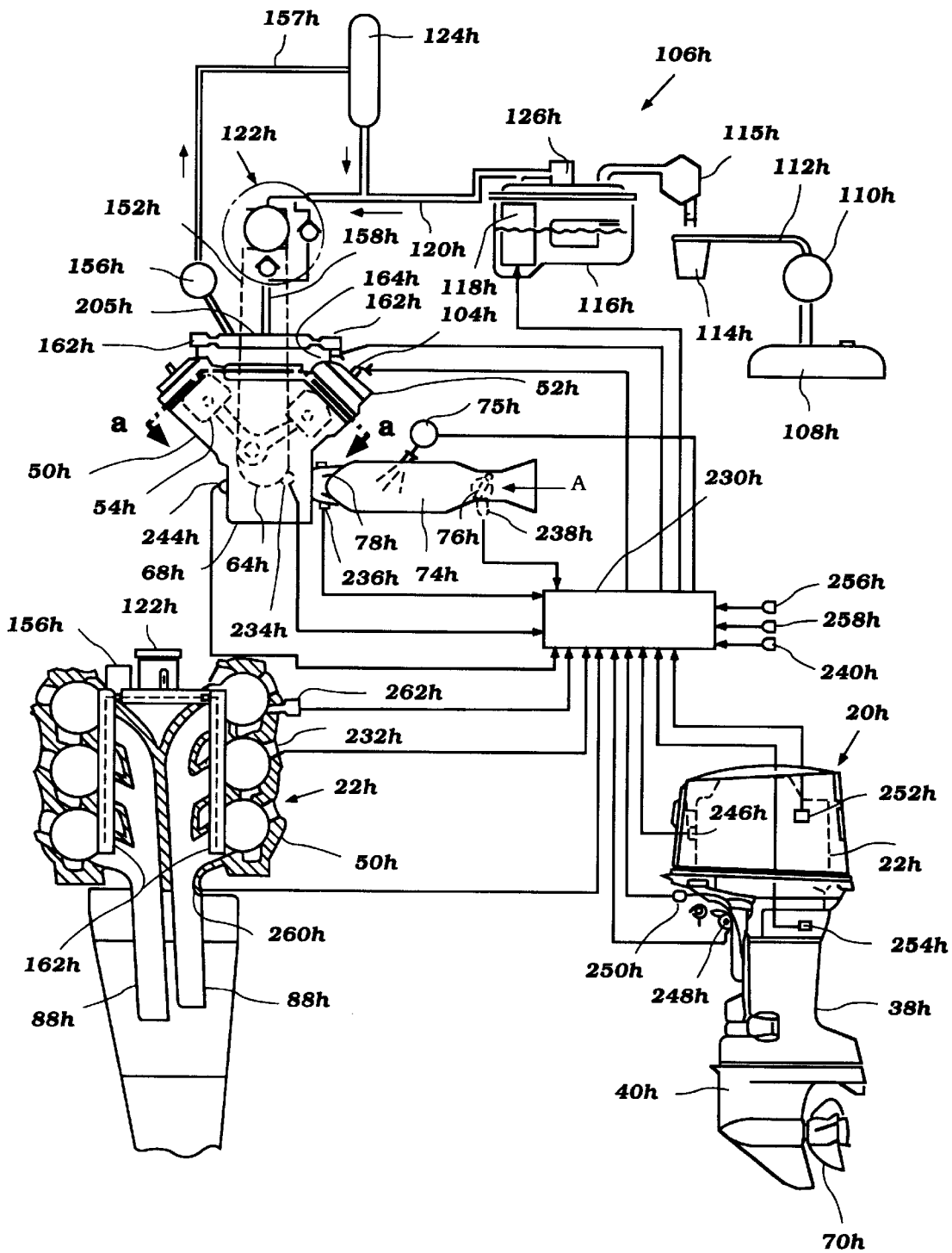
FIG. 21 schematically illustrates a fuel supply system in accordance with a seventh embodiment of the present invention used to supply fuel to an engine powering an outboard motor, the engine illustrated in a plan view and in a cross-sectional view taken along line a—a of the plan view, and illustrating the outboard motor in a side view.

A seventh embodiment fuel supply system 106*h* is illustrated in FIG. 21. In the description and illustration of this embodiment, similar parts have been given like reference numerals to those used in the above embodiments, except that an "h" designator has been added thereto.

This embodiment fuel supply system 106*h* is very similar to the last embodiment illustrated in FIG. 20. In this embodiment, the return line 157*h* extends from the control or check valve 152*h* to the fuel line 120*h* and not the vapor separator 116h. In this arrangement, the cooled fuel which is returning through the return line 157h is mixed with the smaller volume of fuel passing through the line 120h (i.e., the fuel is returned to a point upstream of the vapor separator 116h along the fuel delivery path). This arrangement has the benefit of cooling the fuel being delivered through the passage 120h and the returned fuel, which is at a high pressure, lessens the volume of fuel which must be repumped by the pre-pressurizing pump 118h from the low pressure fuel chamber of the separator 116h. Since less fuel must be pumped, less fuel vapor is generated in the pumping process by the pre-pressurizing pump 118h.

Figure 22:
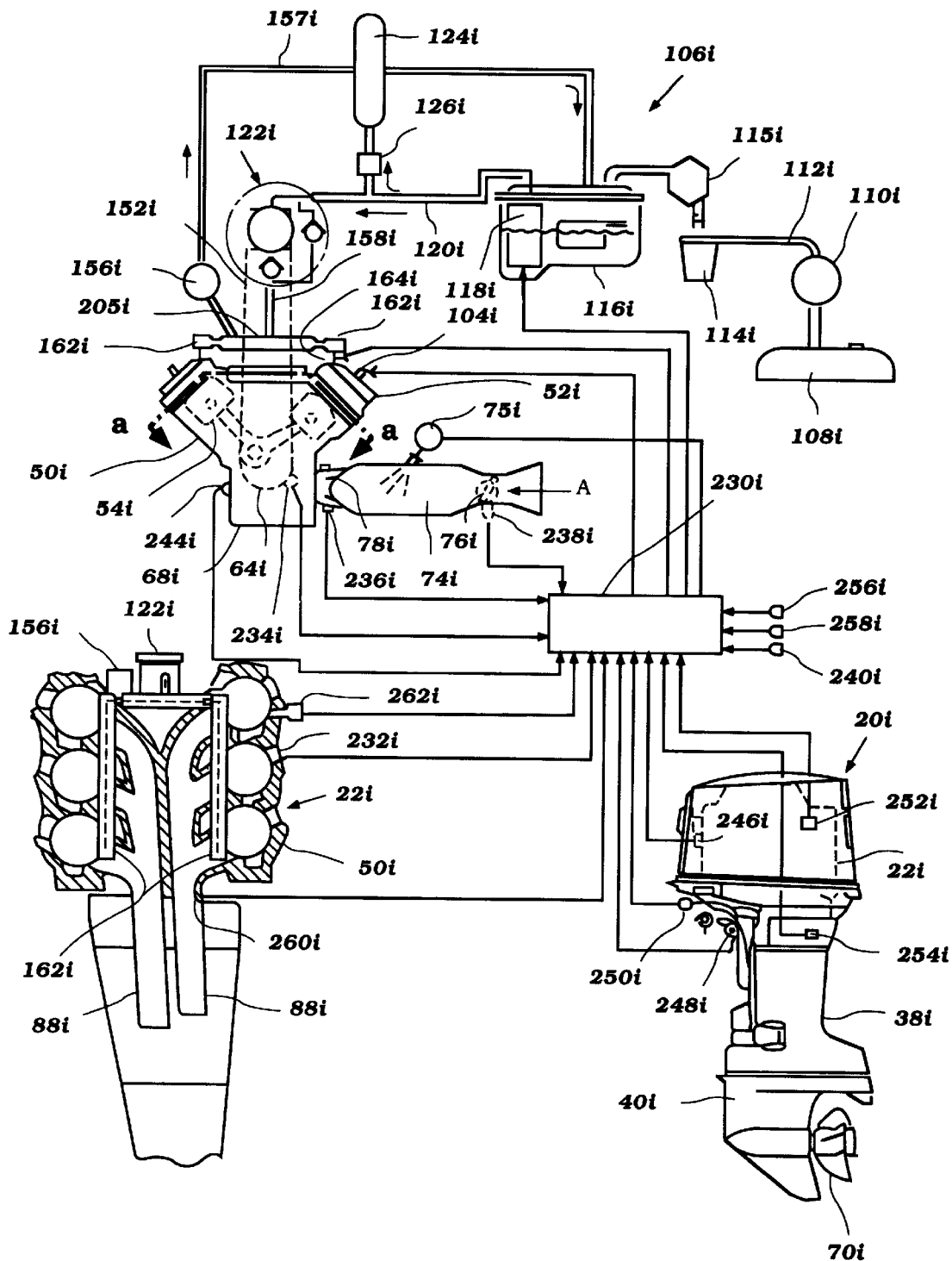
FIG. 22 schematically illustrates a fuel supply system in accordance with a eighth embodiment of the present invention used to supply fuel to an engine powering an outboard motor, the engine illustrated in a plan view and in a cross-sectional view taken along line a—a of the plan view, and illustrating the outboard motor in a side view.

An eighth embodiment fuel supply system 106i is illustrated in FIG. 22. In the description and illustration of this embodiment, similar parts have been given like reference numerals to those used in the above embodiments, except that an "i" designator has been added thereto.

This embodiment fuel supply system 106i is similar to that illustrated in FIG. 21 and described above. In accordance with this embodiment, fuel which is returned through the return line 157i again passes through a fuel cooler 124i and thereon back to the vapor separator 116i.

Fuel is pumped from the vapor separator 116i by the pre-pressurizing pump 118i and delivered to the high pressure pump 122i through a fuel line 120i. In the event the fuel pressure in this line 120i exceeds a predetermined pressure, fuel is relieved through a check valve 126i through the fuel cooler 124i into the return line 157i.

In this arrangement, the fuel at high pressure which is relieved and may contain a significant vapor content passes through the fuel cooler.

In the embodiments of the invention described above, it should be understood that the various fuel, lubricant and vapor lines may comprise any number of materials as known to those skilled in the art. For example, the fuel lines may comprise rubber hose, metal piping, and even one or more passages formed within a portion of the engine such as the cylinder block.

In the embodiments of the fuel system described above, it should be understood that the pre-pressurizing pump 188a–h may be driven or operated at a speed which is proportional to engine speed. For example, when the engine speed is low, the pre-pressurizing pump 188a–h is preferably operated at a low speed, since the fuel requirements of the engine 22a–h are reduced. This may be accomplished through an electronic control when the pre-pressurizing pump 118a–h is of the electric type. As disclosed above, the high-pressure pump 122a–h is operated at a speed proportional to the engine speed since it is driven by the crankshaft of the engine 22a–h.

Those of skill in the art will appreciate that certain features of one or more embodiments of each fuel supply system 106a–h described above may be used or incorporated into other embodiment fuel supply systems.

Of course, the foregoing description is that of preferred embodiments of the invention, and various changes and modifications may be made without departing from the spirit and scope of the invention, as defined by the appended claims.

What is claimed is:

1. A fuel supply system for supplying fuel from a fuel source to an engine powering an outboard motor, the engine having at least one combustion chamber, said fuel supply system comprising a vapor separator to which fuel is delivered from the fuel source for separation of vapor from the fuel, a pre-pressurizing pump for pressurizing fuel from the separator and delivering said fuel at a first pressure above a pressure of said fuel within said vapor separator to a high pressure pump, said high pressure pump pressurizing said fuel to a pressure above said first pressure and delivering said fuel to a fuel rail through which fuel is delivered to said fuel injector for delivery into said combustion chamber, a return line extending from said fuel rail to said vapor separator for returning fuel delivered to said fuel rail but not delivered by said fuel injector back to said vapor separator, an adjustment valve for regulating the flow of fuel through said return line and maintaining the fuel in said fuel rail at high pressure, and further including a fuel cooler positioned between said adjustment valve and said vapor separator along said return line for cooling said fuel passing therethrough.

2. The fuel supply system in accordance with claim 1, further including a relief valve for relieving fuel over a predetermined high pressure from the fuel system between said pre-pressurizing pump and said high pressure pump back to said vapor separator.

3. The fuel supply system in accordance with claim 1, wherein said pre-pressurizing pump is positioned within said vapor separator.

4. The fuel supply system in accordance with claim 1, wherein said fuel cooler comprises a water-cooled vapor separator.

5. The fuel supply system in accordance with claim 1, including a control operating said pre-pressurizing pump at a low speed when a speed of said engine is low.

6. The fuel supply system in accordance with claim 1, wherein at least a portion of the fuel supplied by said pre-pressurizing pump to said high pressure pump is returned through a line back to said vapor separator.

7. The fuel supply system in accordance with claim 1, wherein at least a portion of the fuel supplied by said pre-pressurizing pump passes through a fuel cooler and is returned to said vapor separator.

8. A fuel supply system for supplying fuel from a fuel source to an engine powering an outboard motor, the engine having at least one combustion chamber, said fuel supply system comprising a vapor separator to which fuel is delivered from the fuel source for separation of vapor from the fuel, a pre-pressurizing pump for pressurizing fuel from the separator and delivering said fuel at a first pressure above a pressure of said fuel within said vapor separator to a high pressure pump, said high pressure pump pressurizing said fuel to a pressure above said first pressure and delivering said fuel to a fuel rail through which fuel is delivered to said fuel injector for delivery into said combustion chamber, a return line extending from said fuel rail to a point along said fuel system after said pre-pressurizing pump for returning fuel delivered to said fuel rail but not delivered by said fuel injector, an adjustment valve for regulating the flow of fuel through said return line and maintaining the fuel in said fuel rail at high pressure, and further including a fuel cooler positioned along said return line for cooling said fuel passing therethrough.

9. The fuel supply system in accordance with claim 8, wherein said pre-pressurizing pump is operated at a low speed if a speed of said engine is low.

10. The fuel supply system in accordance with claim 8, wherein said valve is pressure operated and positioned along said second fuel line.

11. The fuel supply system in accordance with claim 8, wherein said second fuel line leads to a first end of said fuel rail and said valve is pressure operated at positioned at a second end of said fuel rail.

12. The fuel supply system in accordance with claim 8, further including a fuel cooler positioned along said fuel supply system between said vapor separator and said second pump.

13. The fuel supply system in accordance with claim 8, further including a fuel filter positioned along said fuel supply system between said second pump and said fuel injector.

14. The fuel supply system in accordance with claim 8, wherein at least a portion of the fuel supplied by said pre-pressurizing pump to said high pressure pump is returned through a line back to said vapor separator.

15. The fuel supply system in accordance with claim 8, wherein at least a portion of the fuel supplied by said pre-pressurizing pump passes through a fuel cooler and is returned to said vapor separator.

\* \* \* \* \*